United States Patent [19]

Rocks

[11] Patent Number: 5,974,348
[45] Date of Patent: Oct. 26, 1999

[54] SYSTEM AND METHOD FOR PERFORMING MOBILE ROBOTIC WORK OPERATIONS

[76] Inventor: James K. Rocks, 42542 Saint Clair La., Leesburg, Va. 20176

[21] Appl. No.: 08/766,486

[22] Filed: Dec. 13, 1996

[51] Int. Cl.[6] ........................... G06F 165/00; G01C 21/00
[52] U.S. Cl. .............................. 701/28; 701/300; 701/50; 348/120
[58] Field of Search .................................. 701/2, 25, 28, 701/50, 217, 300; 318/587; 180/167, 168, 169; 348/119, 120

[56] References Cited

U.S. PATENT DOCUMENTS

| | | | |
|---|---|---|---|
| 4,119,900 | 10/1978 | Kremnitz | 318/587 |
| 4,556,940 | 12/1985 | Katoo et al. | 364/424 |
| 4,638,445 | 1/1987 | Mattaboni | 364/513 |
| 4,651,283 | 3/1987 | Sciaky et al. | 364/477 |
| 4,677,555 | 6/1987 | Goyet | 364/424 |
| 4,700,301 | 10/1987 | Dyke | 364/424 |
| 4,796,198 | 1/1989 | Boultinghouse et al. | 364/513 |
| 4,811,228 | 3/1989 | Hyyppä | 364/424.02 |
| 4,817,000 | 3/1989 | Eberhardt | 364/443 |
| 4,875,172 | 10/1989 | Kanayama | 364/513 |
| 4,893,025 | 1/1990 | Lee | 250/561 |
| 4,939,650 | 7/1990 | Nishikawa | 364/424.02 |
| 4,939,651 | 7/1990 | Onishi | 364/424.02 |
| 4,947,324 | 8/1990 | Kamimura et al. | 364/424.02 |
| 5,008,557 | 4/1991 | Noji et al. | 250/561 |
| 5,111,126 | 5/1992 | Powell et al. | 318/568.16 |
| 5,165,064 | 11/1992 | Mattaboni | 356/152 |
| 5,174,385 | 12/1992 | Shinbo et al. | 172/4.5 |
| 5,220,876 | 6/1993 | Monson et al. | 111/130 |
| 5,264,709 | 11/1993 | Kamimura et al. | 250/561 |
| 5,305,091 | 4/1994 | Gelbart et al. | 356/375 |
| 5,321,353 | 6/1994 | Furness | 318/568.11 |
| 5,367,458 | 11/1994 | Roberts et al. | 364/424.02 |
| 5,390,125 | 2/1995 | Sennott et al. | 364/449 |
| 5,438,771 | 8/1995 | Sahm et al. | 37/348 |
| 5,471,391 | 11/1995 | Gudat et al. | 364/424.07 |
| 5,473,541 | 12/1995 | Ishino et al. | 364/424.07 |
| 5,477,459 | 12/1995 | Clegg et al. | 364/460 |

OTHER PUBLICATIONS

Borenstein, J., "Measurement and Correction of Systematic Odometry Errors in Mobile Robots," *IEEE Transactions on Robotics and Automation*, vol. 12, No. 6, Dec. 1996, pp. 869–880.

Finck, C., "Hands–off Hay Cutting," *Farm Journal*, Mid–Feb. 1996, p. 9.

Yagi, Y., et al., "Real—Time Omnidirectional Image Sensor (COPIS) for Vision–Guided Navigation," *IEEE Trasactios on Robotics and Automation*, vol. 10, No. 1, Feb. 1994, pp. 11–22.

*Primary Examiner*—Michael Zanelli
*Attorney, Agent, or Firm*—Sterne, Kessler, Goldstein & Fox P.L.L.C.

[57] ABSTRACT

A precise automated work system and method is provided. One or more self-navigating robots can perform automated work operations with precision given six degrees of freedom in a undulating, sloping or irregular terrain, such as, a commercial truck garden. A self-propelled robot moves through the garden and performs gardening tasks following a specified course by dead-reckoning and periodically determining its position and orientation by a navigation fix. At least seven navigation beacons are positioned around a perimeter of a garden work area. Each beacon emits electromagnetic radiation across the garden for detection by the self-propelled robot. A panoramic image collector gathers and focuses electromagnetic radiation from each navigation beacon on an electronic camera to form at least seven beam spots. The relative position of the detected beam spots in the focal plane vary depending upon the six degrees of freedom for robot movement in a garden: the robot's three-dimensional position (x,y,z) and the robot's orientation (heading, pitch, and roll). A navigation module determines the position and orientation of the robot within the garden based on the output of the imaging camera. A self-propelled gardening robot performs many varied automated farming tasks from tillage, to planting, to harvesting by controlling the point of impact of a implement carried by a robot with precision, that is, to within an inch on average for any given position coordinate. Commercial feasibility of small truck gardens is improved as automation is comprehensive and accessible to the solitary farmer.

25 Claims, 16 Drawing Sheets

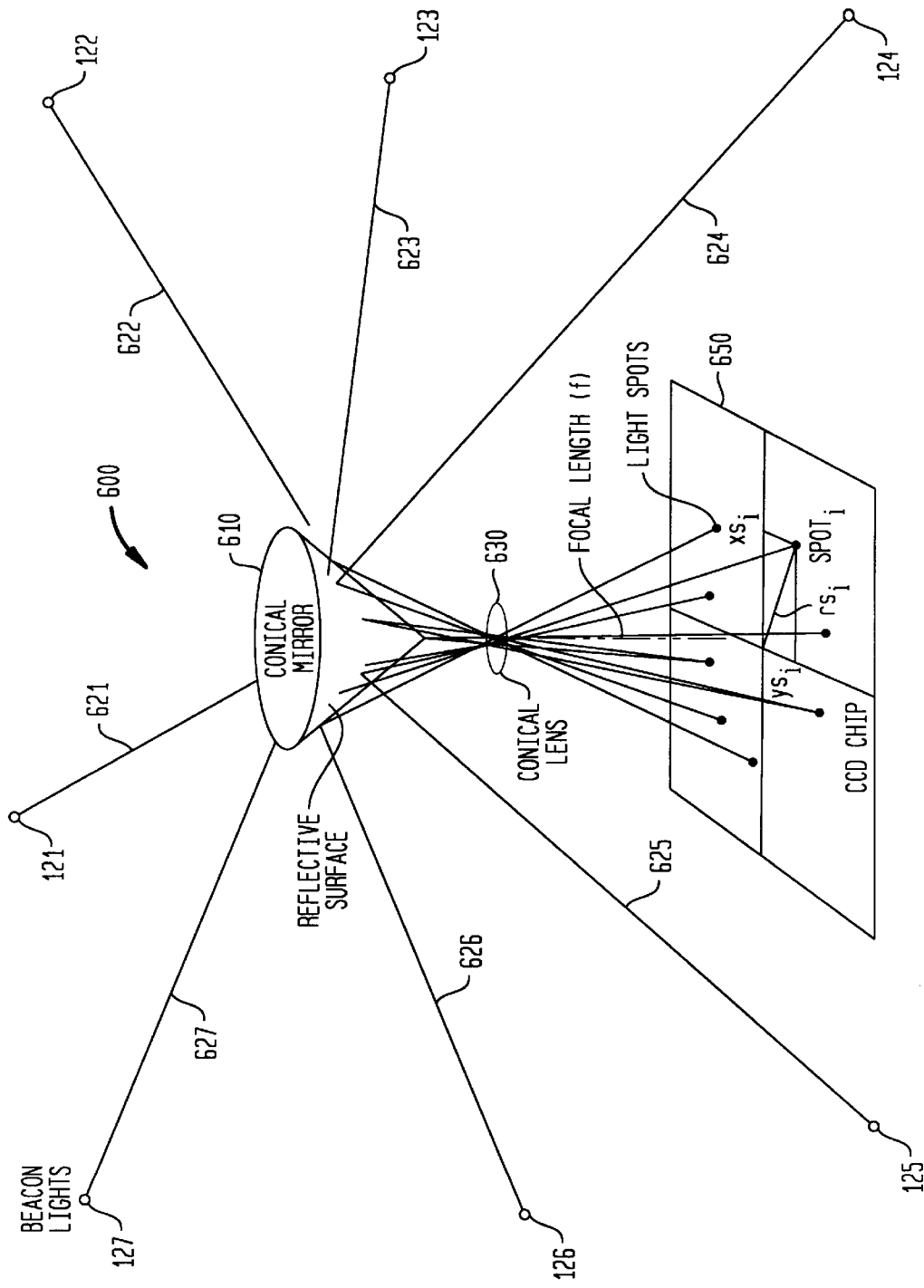

SYSTEM AND METHOD FOR PERFORMING MOBILE ROBOTIC WORK OPERATIONS

BACKGROUND OF THE INVENTION

1. Field of the Invention

The present invention relates to the fields of automation and robotics. Work operations and tasks are carried out by autonomous, self-propelled, self-navigating robots.

2. Related Art

Work operations are under increasing pressure to automate. This is especially true for agricultural operations. Owners of commercial truck farms consisting of fields approximately two to ten acres in size are in special need of a comprehensive, autonomous gardening system to reduce labor costs so as to secure lending and sustain farming as an economically viable land use option.

Automation efforts have proceeded on two fronts: automating work implements and automating guidance of work vehicles. Work implements are effective in performing repetitive tasks such as tillage, planting, fertilizing, cultivating, spraying and harvesting of some kinds of crops. However, effective use of these work implements requires precise guidance of the implement through the field and positioning of the implement in the row, ideally within less than an inch of a target point.

Special challenges arise in determining position with sufficient accuracy in an agricultural context or other work context having a rough topography. A typical farm plot has a rough, undulating or sloping topography which varies depending upon environmental conditions. The position of a self-navigating farm vehicle, and in particular, the position of a work implement thereon, has six degrees of freedom: three-dimensional space, heading, pitch, and roll. Thus, as the inventor discovered, a guidance system for a robot performing precise agricultural work operations must determine position information with respect to six degrees of freedom. A guidance system must determine position information with an accuracy of less than a foot, preferably within one-half inch, even for rough work topographies.

Conventional guidance systems which assume a structured environment allowing only three degrees of freedom, (x, y, heading) such as robots moving in warehouses or on other flat surfaces are not applicable. See, e.g., the automated guided vehicles in U.S. Pat. Nos. 4,119,900; 4,796,198; 4,811,228; 4,817,000; and 5,367,458; and the IEEE article by Yagi et al., "Real-Time Omnidirectional Image Sensor (COPIS) for Vision-Guided Navigation," (each of which is incorporated herein by reference). Designers of these guidance systems face three degrees of freedom and do not encounter the same problems as self-guided systems which move on surfaces that induce tilt.

Global-positioning systems (GPS) have been proposed for self-navigating terrestrial vehicles. To the inventor's knowledge, current commercial GPS positions have an error in the range of 15 meters, although the use of a nearby ground station whose location is known precisely as well as a moving receiver on the vehicle may improve accuracy to within several feet. It remains to be seen whether GPS can effectively and reliably provide position information with an accuracy suitable for controlling agricultural implements in the row. See, e.g., U.S. Pat. Nos. 5,220,876; 5,390,125; 5,438,771; and 5,471,391 (each of which is incorporated herein by reference).

A commercially viable automated farm vehicle must also be simple to operate, durable, and reliable. Scanning systems with mechanical moving parts susceptible to dirt and debris can require frequent servicing. See, e.g., U.S. Pat. Nos. 4,700,301; 4,947,324; 5,008,557; and 5,264,709 (each of which is incorporated herein by reference). Guidance systems requiring specialized survey knowledge for placement of beacons can also be burdensome and commercially limiting for a sole system operator such as a commercial truck gardener. See, e.g., U.S. Pat. Nos. 4,677,555 and 5,477,459 (each of which is incorporated herein by reference).

What is needed then is a precise navigation system and method that detects the position of a self-navigating robot with respect to six degrees of freedom to perform precise work operations over a rough topography. In some applications such as agricultural work operations, a guidance system and method is needed that determines position information with respect to six degrees of freedom with an accuracy of less than a foot, preferably within an inch, even for rough work topographies.

Further, automation of work operations needs to be comprehensive and accessible to farmers of small tracts and solitary operators. A simple system and method is needed for specifying the navigation path to be followed by a self-guided robot through a work area, such as a commercial truck garden plot. Control operations to be performed by the robot along the path must also be easily identified and updated. It is further desirable that information specifying navigation path and control operations to be performed for one crop in a field be able to be preset, saved, modified and exchanged between the self-guided robot and an off-site computer terminal so that a specification can be reused.

SUMMARY OF THE INVENTION

The present invention provides a precise automated work system and method. A self-navigating robot is provided for performing automated work operations with precision in rugged terrain. A new navigation algorithm and navigation system can determine location within an inch and heading within one-sixth of a degree in a ten acre work area whose surface may be rough, undulating and sloping inducing tilt up to 15 degrees. The system is appropriate for any work for which implements exist where the environment can be so described as well as being adaptable to other environments.

In one embodiment, a robotic gardening system and method for performing automated tasks in a garden is provided. The robot is instructed by means of a table of data elements, called the scenario, which specifies, as a series of linked arcs, the directions, distances and speeds it is to move from its original location and heading. The robot follows these instructions by dead reckoning. Periodically, e.g., about once per second, the robot executes a navigation "fix" to determine its exact location and direction and uses this information to correct its course toward the desired course.

Seven or more navigation beacons are positioned around the perimeter of a work area which may be a garden. Each beacon emits or reflects electromagnetic radiation across the garden for detection by the self-propelled robot. In a further feature, the heights of the beacons are varied to increase accuracy.

A panoramic image collector on the robot gathers and focuses electromagnetic radiation from each navigation beacon at a common focal plane, usually the chip in a CCD camera, to form at least seven beam spots corresponding to the respective navigation beacons. The relative position of the detected beam spots in the focal plane varies depending upon the six degrees of freedom for robot movement in a garden: the robot's three-dimensional position (x,y,z) and the robot's orientation (heading, pitch, and roll). The camera outputs electrical signals representative of this first image to a navigation processor. The navigation processor then determines the position and orientation of the robot within the work area based on the output of the imaging camera. The assumed position of the robot is compared with the actual position and changes in velocity and direction are made to return the robot to its planned location and heading as required.

A controller controls driver motors to propel the robot along the predetermined path. The controller further controls one or more implements attached to the robot to perform gardening tasks as specified in the scenario.

According to one aspect of the present invention, each navigation beacon includes an emitter for emitting electromagnetic radiation, such as, infrared, visible or UV radiation. A switch means is used to flash each emitter. The imaging camera is synchronized with the switching of the emitters so that ambient background radiation can be subtracted.

According to another aspect of the present invention, the panoramic image collector further comprises a panoramic mirror having a conical, spherical, or "Gothic" shape. The field of view of the camera as provided by the panoramic image collector extends 360 degrees horizontally around the robot and approximately 30 degrees above and below the horizon so as to include the lights of the navigation beacons regardless of tilt of the robot.

In addition to direction and location in the plane, rough, sloping or undulating terrain subjects the robot to tilt so that the navigation processor must deal with six degrees of freedom. In this invention, the processor determines the actual location and orientation of the robot by a series of computations performed on the images of the lights as captured by the panoramic collector. Another computer module then compares the actual location and direction with the desired location and direction and directs a motor controller to adjust the location and heading of the robot to correct the error.

Control can further be provided to counter pitch and/or roll in the orientation of the robot's implement. The controller can further control a work implement to perform tasks at predetermined locations along the predetermined path with precision based on the detected position determined by the navigation processor.

In agricultural operations, one or more implements can be used. Each implement can be any type of automated agricultural implement, such as a tiller, a sprayer, seed planter, cultivator, mulcher, vacuum insect controller, harvester, and prepacker.

A remote radio control unit can be provided as an accessory for manually controlling robot operations in the case of emergencies.

According to the present invention, a self-propelled robot performs many varied automated farming tasks from tillage, to planting, to harvesting by controlling the point of impact of a implement carried by a robot with precision, that is, to within one half inch. Automation is comprehensive and accessible to the farmer of small tracts working alone which improves the commercial feasibility of truck farms.

Further features and advantages of the present invention, as well as the structure and operation of various embodiments of the present invention, are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art make and use the invention.

FIG. 6A shows an example of the paths of beacon light rays through an optical unit to an imaging camera in the present invention;

Figure 1:
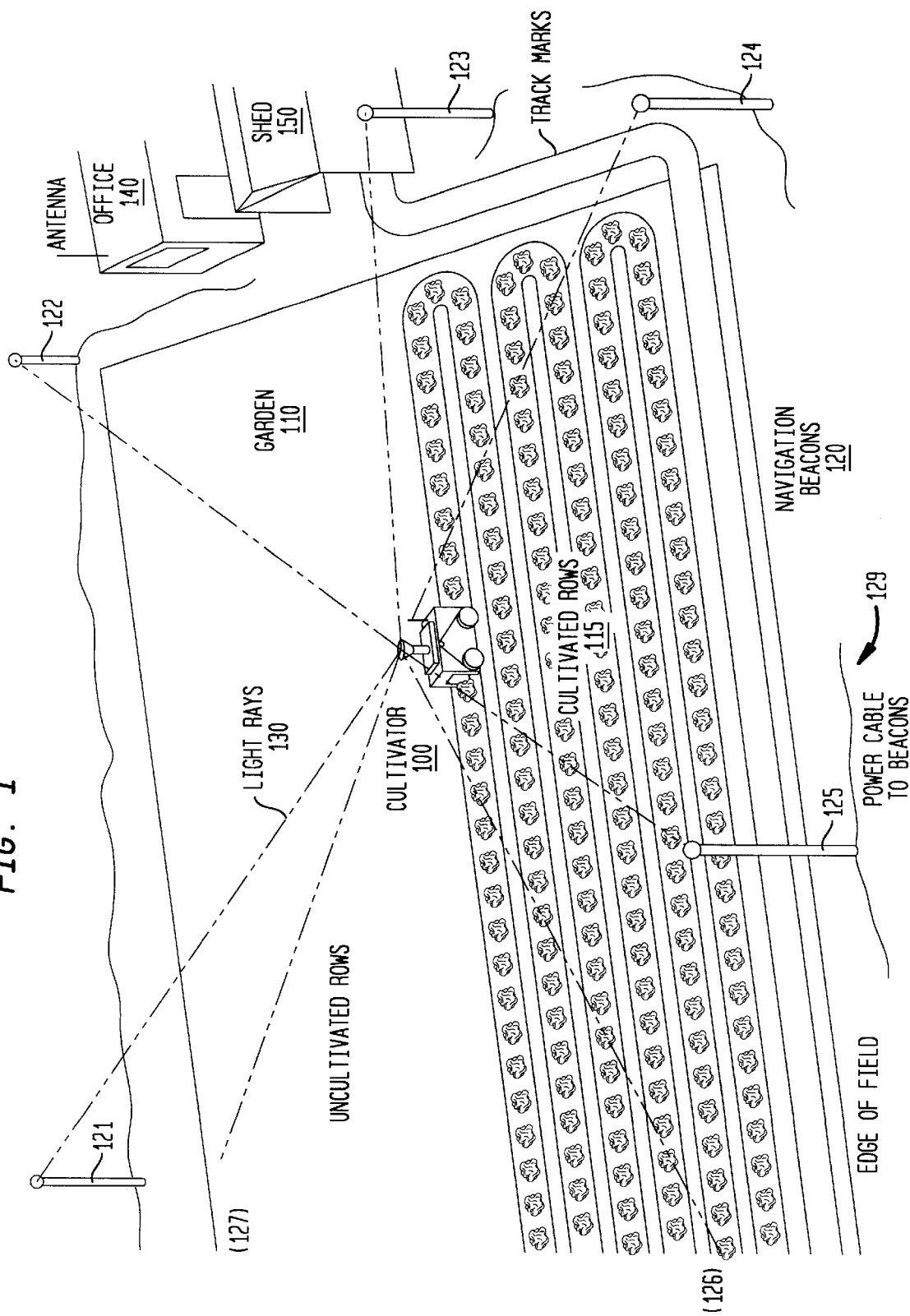
FIG. 1 is a view of the precise robotic gardening system according to the present invention performing cultivation of a row crop in a commercial truck farm.

The present invention will now be described with reference to the accompanying drawings. In the drawings, like reference numbers indicate identical or functionally similar elements. Additionally, the left-most digit(s) of a reference number typically identifies the drawing in which the reference number first appears.

Overview

The present invention relates to an automated system and method for performing precise work operations in a predetermined work area. An autonomous, self-propelled robot under the control of an on-board computer moves along a specified path in a work area by dead reckoning. A navigation system on the robot periodically determines the position and orientation of the robot with respect to at least seven navigation beacons surrounding the work area. The navigation beacons can have different relative heights to further improve accuracy.

Six degrees of freedom are accommodated in determining the robot's position and orientation. The navigation system compares the detected position and orientation (at least the robot's location and direction), with the desired position and orientation determined from a previously prepared list of actions called a scenario. If an error is observed, a control system corrects the robot's course to return it to the desired direction and location.

The robot carries and controls work implements capable of doing repetitive tasks within the work area without human control. The operation and movement of the robot is carried out under the control of an on-board computer according to a pre-stored scenario. In one implementation, to configure the robot for work, the navigation path and control operations to be performed by the robot's work implement(s) along the path are described by a human operator who encodes them in a document called a work order. The work order is entered into an off-line computer that converts the work order to a list of detailed data elements called a scenario. The scenario is written to a floppy disk which is passed to the computer on the robot. When it is time to execute the scenario, the on-board computer reads the scenario line by line and converts the data to physical actions of the robot and its implements until all tasks for a given scenario are complete.

A number of control functions, such as "STOP," may also be provided through a radio remote control unit to allow human management of the robot in the case of unprogrammed emergencies or other needs.

Terminology

"Work area," as used herein, refers to any type of surface area (man-made, land, water, or outer-space) in which the robot and beacons can survive and work. A work area can include, but is not limited to, a commercial truck garden.

"Rough topography" as used herein refers to a non-planar work area surface on which a robot travels that can induce tilt.

"Precise" as used herein with reference to a precise guidance system or method, precise position detection, and/or precise work operations, means an accuracy of less than one foot, and preferably, an accuracy of less than one inch. Precision is primarily dependent on number of pixels on the camera chip, the design of the beacon system and size of the work area. Simulation studies of the present invention, as described herein, maintain accuracies of approximately 0.17 inches on average across a work area.

"Six degrees of freedom" refers to the location of an object as measured along the axes of a three dimensional orthogonal system and as the axes of the object are transformed by rotation around the corresponding axes of the embedding space. Conventionally, location is labeled x, y and z, pitch, roll and yaw. Yaw is the apparent heading. Roll, pitch and yaw are terms frequently used in aircraft control systems. The transformation of coordinates required is dealt with mathematically by Euler equations.

Example Environment

The present invention is described in the example environment of automated agricultural operations. In addition to agricultural uses described herein, the navigation system can be used to direct the path of any robotic machine in any work area boundable by navigation beacons. Some example uses in alternative environments are: cleaning the ice in a hockey rink, mowing golf greens and tees and small fairways, snow removal from an irregularly shaped undulating parking lot, picking up golf balls at a driving range, mowing the grass areas in cloverleaf intersections by reference to the public lighting fixtures, navigating small boats in confined waters, vacuuming the rugs in large rooms, clearing minefields and toxic wastedumps, moving material about a large undulating storage area and controlling construction vehicles such as bulldozers and pans. Other applications of the system include route control of autonomous robot submersible vehicles operating in a confined volume in deep water, or of autonomous space vehicles tending elements of a space station.

The present invention can also be used to in conjunction with manned operations. For example, a self-propelled robot in the present invention can be used to tow a transplanter which carries one person who feeds the transplanting mechanism with transplants. This eliminates the need for a driver in an operation which is widely used but which still requires a person to untangle the transplants and place them in the fingers of the transplanter. Likewise, a seat for a human operator can be pushed ahead of the vehicle allowing the rider to carry out tasks which ordinarily would require both the rider and a driver, viz, picking strawberries or asparagus.

Furthermore, the navigation system can be used to assist the operator of a manned machine in accurately maintaining a pre-specified path in an area. The navigation unit can be installed on the roof of a manned tractor or truck spreading fertilizer or spraying liquids. Instead of controlling the velocity and direction of the tractor directly, the unit would present visual signals to the tractor driver in order to assist him or her in steering so as to maintain the course specified in the scenario.

Description in these terms is provided for convenience only. It is not intended that the invention be limited to the application in this example environment or the above-mentioned alternative applications. In fact, after reading the following description, it will become apparent to a person skilled in the relevant art how to implement the invention in further alternative environments.

Precise Robotic Gardening System and Operation

A precise robotic gardening system and method according to one embodiment of the present invention will be now be described with respect to FIG. 1. In FIG. 1, a self-propelled robot 100 moves through a garden 110 carrying one or more agricultural implements which perform agricultural operations. Seven or more navigation beacons 121–127 are provided around the perimeter of the garden 110. To maximize accuracy, the lights on the beacons 121–127 do not lie in the same plane. Preferably, the lights lie as far as possible above and below a least squares best fit plane which the lights define (see FIG. 8).

Light rays 131–137 travel from the navigation beacons 121–127, respectively, to the robot 100. The robot 100 has an on-board camera that detects the light rays 131–137. An on-board computer system processes the camera output to detect position and orientation for six degrees of freedom. The camera and computer system will be described further below with respect to FIG. 2.

A beacon cable 129 connects each navigation beacon and a remote control unit (not shown) at remote office 140. Control signals for flashing the navigation beacons on and off are provided over the beacon cable 129. The beacons are on poles which are inserted into tubes permanently placed in the ground and wired for this use.

Figure 2:
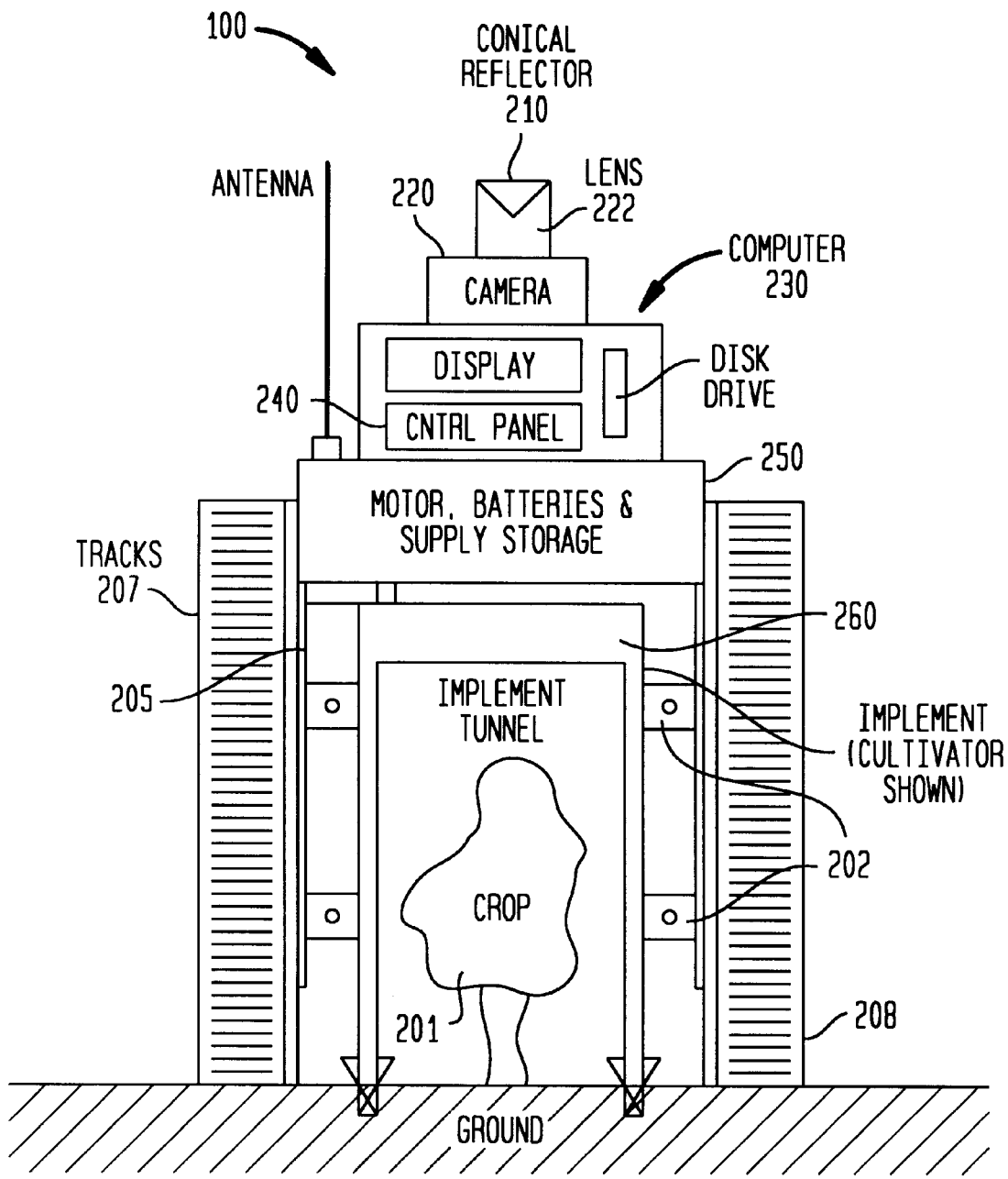
FIG. 2 is a schematic front view of an example robot used in the present invention.

One example of a self-propelled robot 100 according to the present invention is shown in more detail in FIG. 2. FIG. 2 shows a front view of the self-propelled robot 100. The robot 100 includes a generic prime mover cart 205 which straddles a row of crops 201. Two tracks 207, 208 are used to provide traction over the ground on opposite sides of the row of crops 201. Hubs and wheels are mounted within the tracks 207, 208 for propelling the cart 205. Fasteners 202 are provided for mounting implements such as tillers, cultivators, thinners, harvesting devices, or attachments which can carry supplies, such as, bins for seeds, fertilizer, or harvested crops. The cart 205 can be self propelled by two battery powered motors. Ordinarily and for large fields and heavy loads, a small IC gasoline or diesel motor-generator set can be carried to keep the battery charged during longer, more strenuous periods of operation. For some implements, the power supply for the implement is provided with the implement so that the power supply for the carrier does not have to be changed.

The entire cart 205 is preferably dimensioned to fit the conventional 30" row spacing, being 34" wide overall, counting the tracks 207, 208 leaving 30" clear for the bed. The frame is 48 inches long, adequate to carry the attachments and supplies, and the underside of its deck is 30 inches above the ground, sufficient for almost all tasks on almost all vegetables. If a market for a harvester of such crops as sweet corn emerges, a different configuration can be assembled which is narrow enough to go between 36" rows and tall enough to reach the ears and see the beacons which would be hidden by the crop otherwise. In this configuration, the row being worked is beside the path of the robot.

Of course, the present invention is not limited by these specific cart dimensions. Any cart dimension and orientation can be used depending upon the specific gardening application, i.e., layout of rows, crop height, agriculture operation to be performed. Further, for some crops a multi-row configuration is more appropriate requiring a wider crop tunnel and several identical implements. Likewise the length of the machine may be increased for some applications. Similarly, a tow hitch or a front end frame or two side platforms could be provided for human workers to ride on.

According to the present invention, in FIG. 2, cart 205 supports a panoramic image collector 210, imaging camera 220, and a computer 230. The imaging camera 220 further includes a focusing lens 222 and an image detector (not shown). Computer 230 is coupled to a controller 240. Controller 240 controls the operation of the drive motors 250 and implements 260. The computer 230 further includes a floppy disk drive, standard I/O connectors and a radio antenna for receiving beacon timer pulses and transmitting requests for assistance and receiving manual control signals and other data.

As shown in FIG. 2, the effectiveness of the automated robot 100 depends upon its ability to accurately position the implement 260 with respect to the crop 201. In particular, the desired position of the point of contact of the implement 260 relative to the crop 201 must be determined even when the optical system is tilted. The location of the robot 100 needs to be adjusted to compensate for the fact that the implement is shifted by the tilt from its desired location relative to the crop.

It is important from a commercial standpoint that the self-propelled robot 100 be able to perform its navigation and work operations with little or no oversight by a farmer. In this way, a solitary farmer is free to perform other tasks while the robot 100 is performing time consuming field tasks. It is also desirable that any pre-processing or initialization of the robot's control be able to be performed in a straightforward fashion with minimum time and effort and little or no technical support. Field planning must be user-friendly and flexible to gain commercial acceptance.

Automated Navigation and Work Operation

The structure and operation of the automated robotic gardening system is described further with respect to FIGS. 3 to 7.

Figure 3A:
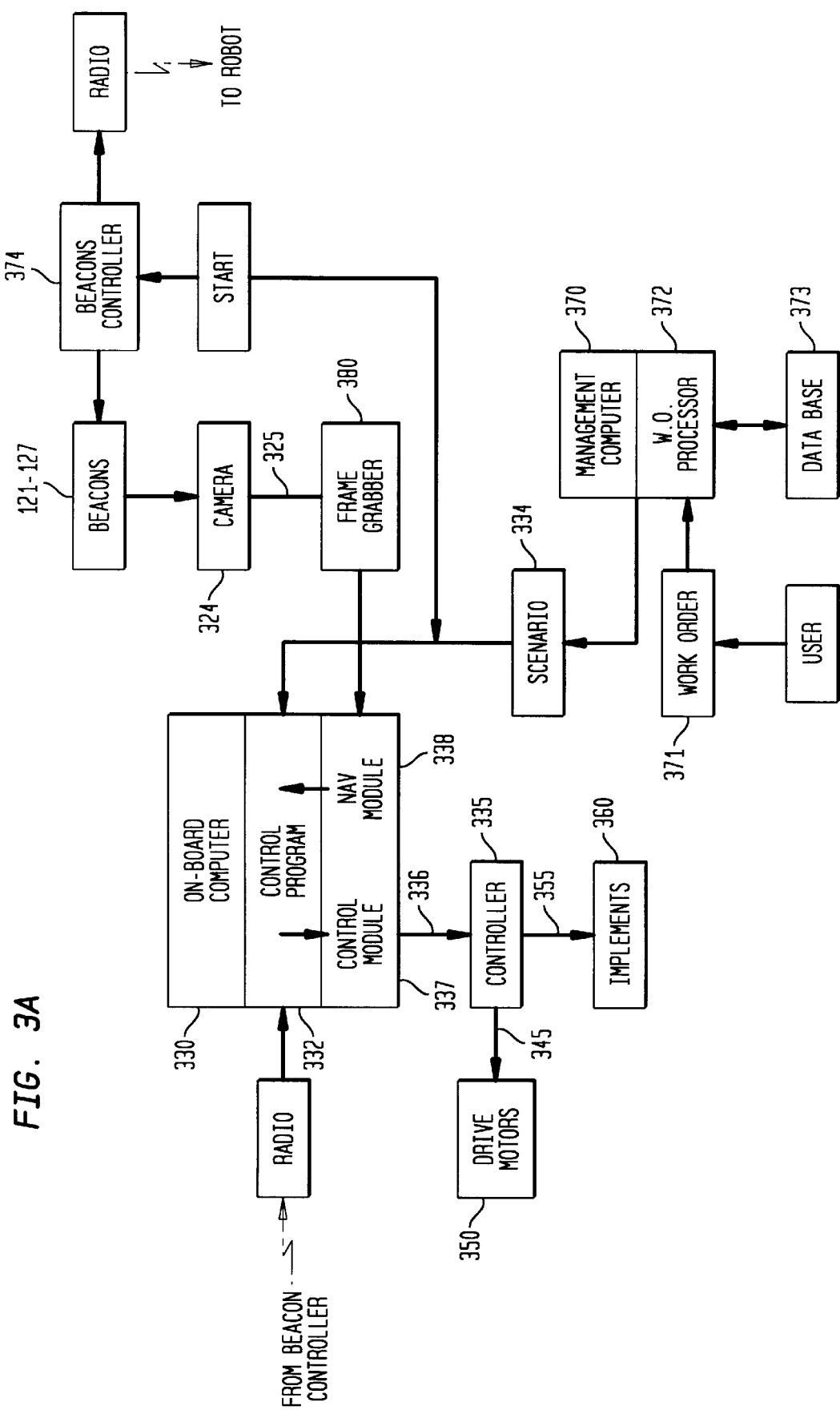
FIG. 3A is a block diagram of an embodiment for performing automated navigation and work operations according to the present invention.
Figure 3B:
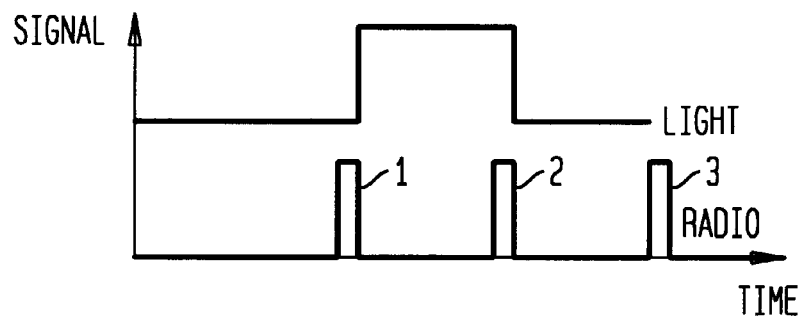
FIG. 3B is a timing diagram showing an example timing relationship between a beacon light pulse and corresponding radio pulses in the present invention.

As shown in FIG. 3A, a computer system 330 is provided on board the robot 100. Computer system 330 uses a general control program module 332 that reads in a scenario 334, responds to interrupts and calls sub-modules, including control module 337 and navigation module 338, which perform specific tasks. These tasks consist primarily of (1) selecting and transferring to the motor controllers the velocities for the cart-tracks so that the cart will follow the course specified in the current line of the scenario, (2) sending signals to the implements as required by the scenario, (3) listening for signals indicating that the beacons are now on (or off), (4) reading in the images from the CCD camera and computing from detected beamspots the current location and direction of the cart, (5) comparing present location with desired location and choosing a sequence of links to get the cart back on track, the links thereupon being transferred to the controller 337; and (6) responding to interrupts caused when timer intervals for various functions time out or when an on-board radio receives an emergency message from the human operator.

In one example, the computer system 330 is an industrial grade process control computer with at least one external disk drive and/or communications port for reading or downloading a computer program product having program logic recorded thereon. In this way, the disk drive can read digital data representing scenario 334 and store the digital data in memory. Likewise, program code, such as, a program code representing the navigation module 338 described below, can be read from a disk (or downloaded over a communication link) and stored in memory.

Computer 330 receives digital input from frame grabber 380 and outputs digital output to controller 335 for controlling drive motors 350 for moving the robot and implements 360. Computer 330 also transmits and receives radio messages.

A charge-coupled-device CCD camera 324 is coupled through a frame grabber (not shown) to the computer system 330. Output signals 325 representative of detected beam spots corresponding to the navigation beacons 121–127 are output to the frame grabber 380 which provides frames to the navigation module 338. Control module 337 converts signals from the general control program 332 to signals which a controller 335 can use to control driver motors 350 for directing the speed and direction of the robot 100 and/or to control the operation of implements 360. A digital output from the general control program 332 can also control one or more implements 360 directly for performing work operations.

In one preferred embodiment shown in FIG. 3, control module 337 outputs control signals 336 to controller 335. Control signals 336 are generated based on a scenario being executed and the camera output signals 325. Controller 335 then issues control signals 345 to maintain the robot's movement in speed and/or direction along a predetermined path set forth in the stored scenario (or in conformance with a local or remote manual override signal). Controller 335 further issues control signals 355 that control the operation of the one or more work implements 360 along the predetermined path in accordance with the executed scenario operation. Control module 337 and navigation module 338 can be implemented using software, firmware, hardware, or any combination thereof.

Beacon controller module 374 is provided for controlling the activation and de-activation of the beacons 121–127. A remote computer system 370 at office 140 is also provided to provide remote off-line data processing. A work order W.O. processor module 372 is provided for processing work orders and building scenarios for operating the robot 100. Modules 372 and 374 can be implemented using software, firmware, hardware, or any combination thereof.

In one preferred embodiment, the remote computer 370 is a conventional desktop personal computers (PC) with standard accessories, viz, hard and floppy disk drives, a printer, display screen, keyboard, and mouse. The on-board computer 330 is a weatherized industrial process control computer such as the Neptune 586 Single Board CPU non-video, with 166 MHZ Pentium processor, floppy disk pack and 32 Mb RAM. An ADC/DAC I/O board can be used in computer 330 as an interface between the computer and controllers. The on-board computer system 330 is mounted on the robot 100 to control the robot in the field and, preferably, includes a weatherproof package for protection in a variety of adverse field conditions.

The operations to be performed by the robot 100 are prepared in the office and transferred to the robot 100 by means of a floppy disk although in different kinds of applications, for example, in deep ocean, more appropriate means for transferring data via cable or wireless communication can be used. Radio transceivers (not shown) are connected to each PC 330, 370 to form a communication link (e.g., a wireless communications link, such as, an infra-red, radio, or microwave link). This permits the operator to control the robot 100 directly in the event of some unprogrammed condition, and allows alarm and/or status messages to be reported by the robot 100 to the operator during operation.

Information from the CCD camera 324 can be transferred directly to a computer RAM by an available Analog to Digital Converter (ADC) board, e.g., EPIX Pixci which can transfer at 55 MHZ or three 4 Mpx pictures every two seconds using a frame grabber 380. Some image processing by area address manipulation can increase speed remarkably since the 7 or 8 images required occupy a small fraction of the chip. That is, the areas containing the images can be identified in one complete transfer; subsequently just those pixels containing the images need to be transferred in, while the addresses of those blocks are adjusted to keep the images centered in the blocks as the robot moves.

Customized chips whose architecture is appropriate for this application can be used.

Light rays from the beacons are reflected from the panoramic image collector 210, which may be a conical reflector, into the imaging camera 324. Imaging camera 324 can be any two-dimensional image detection camera, such as, a Charge-Coupled Device (CCD) camera (e.g., Kodak Megaplus Model 4.2). Imaging camera 324 is coupled to the computer system 330. Output signals 325 generated by the camera 324, representative of detected beam spots corresponding to the beacons 121–127, are passed through an analog to digital converter to a frame grabber or directly into computer 330 RAM. Specific image processing techniques for detecting discrete beam spots and generating output signals representative thereof are well known and would be obvious to one skilled in the art given this description and do not need to be explained in further detail.

The navigation beacon subsystem 120 consists of at least seven beacons 121–127 arranged around or along the side of the field 110 in a configuration which optimizes navigational accuracy within the physical constraints of the work area. In the agricultural application, each beacon is a tube 6 to 10 feet in length topped by a bright light emitter, usually a halogen bulb. The beacon is inserted snugly into a tube placed permanently in the ground so as to make contact with a power cable. All beacons 121–127 are connected in parallel to the same cable which terminates at a beacon control box 374 which may be located for convenience in the management office 140 or another place near the beacons 121–127. When not in use, the beacons can be removed from the base which is then capped to protect the connector. The control box 375, when actuated for example by a signal from a beacon controller module 374, emits a power signal to the lamps in the beacons of sufficient length to be read by the CCD camera on the robot (about 30 ms.)

Just before a power pulse (which powers the lamps) occurs, the first of a series of three radio pulses is emitted by the beacon radio transmitter and received by the robot radio receiver at a frequency different from the frequency used for robot to management office communications. The three pulses occur in the pattern shown in FIG. 3B. Pulse 1 occurs just before the beginning of the light pulse. Pulse 2 occurs just before the light pulse terminates. Pulse 3 occurs a pulse width after the light pulse ends. These pulses signal the robot 100 to transfer the signals in each pixel to a memory cell associated with the pixel and to begin a readout to the computer which takes a period of time equal to the distance between the pulses. The first and third radio pulses cause a recording of the scene with the lights off. The second pulse causes a recording of the scene with the lights on. The first and third images minus twice the second result in a computer image showing only the lights, the ambient light having been canceled out by this process. Under some circumstances only two images are required.

Figure 4A:
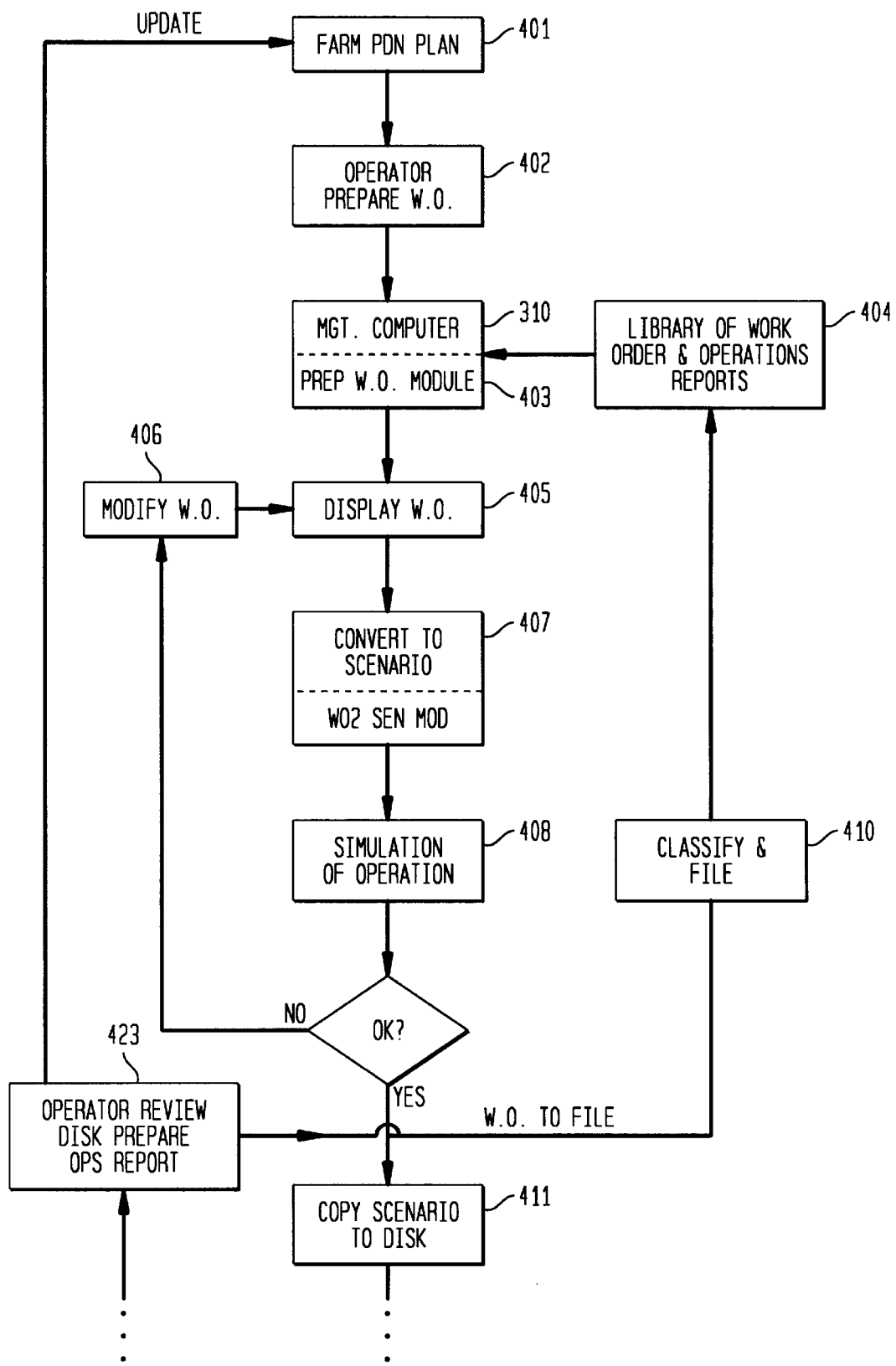
FIGS. 4A and 4B are a flowchart showing an example of overall operations used in the present invention.
Figure 4B:
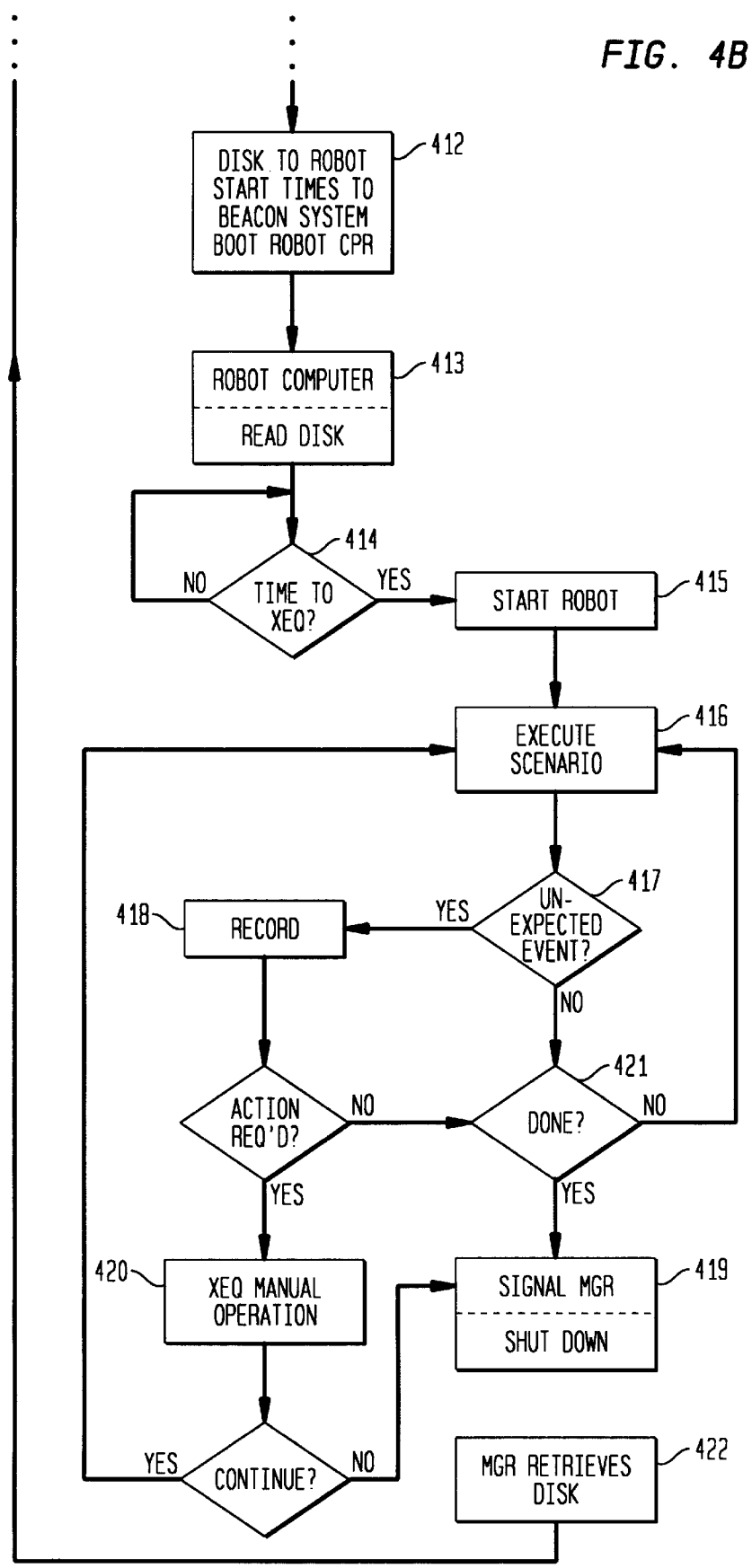
Figure 5:
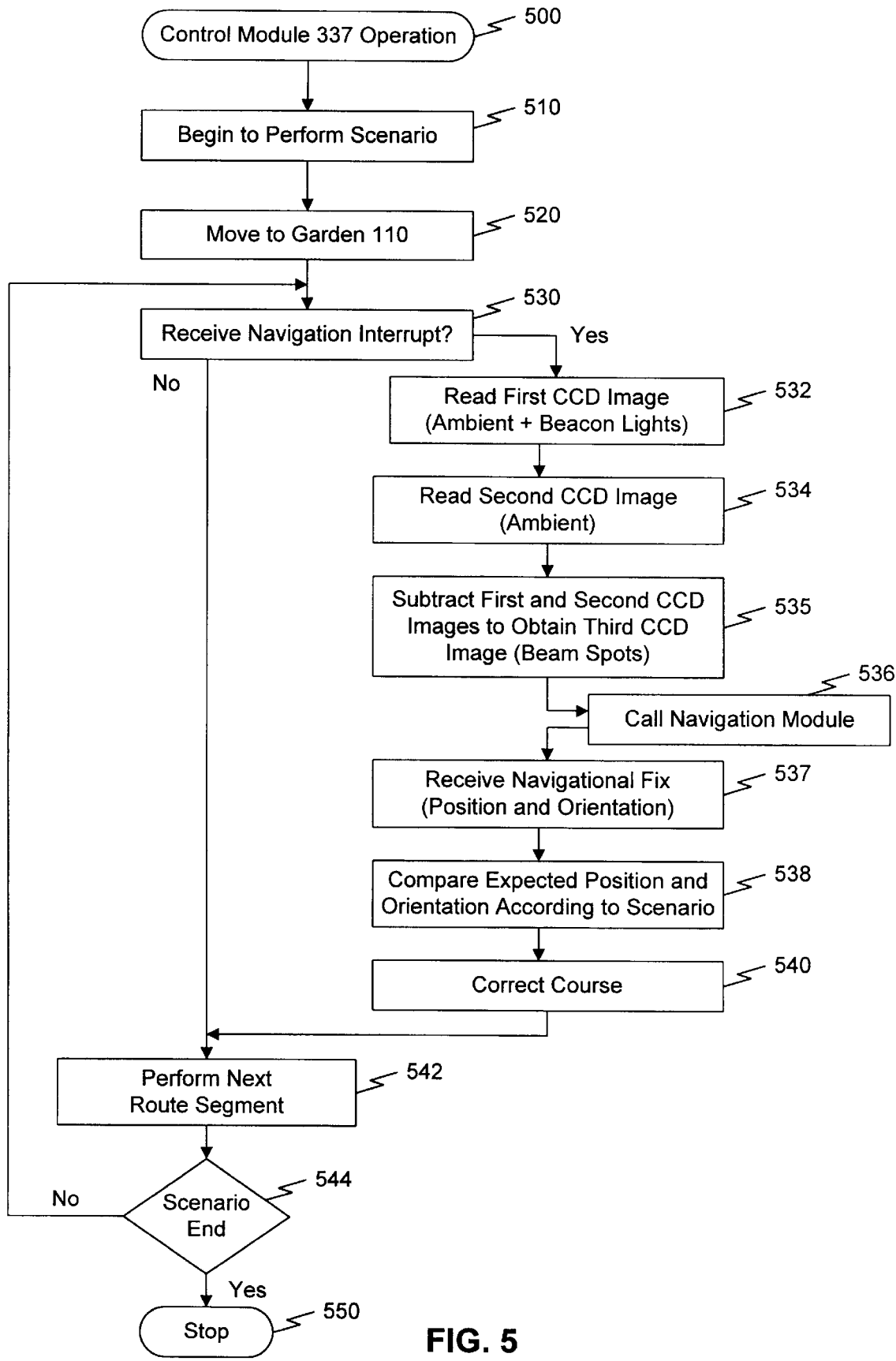
FIG. 5 is a flowchart for a control routine carried out in an on-board computer system of a robot according to the present invention.

The operation of the robotic gardening system and method for performing work operations, and in particular, the operation of the on-board computer system 330 and the remote computer system 370, is described even further with respect to FIGS. 4 to 6.

FIGS. 4A and 4B show an example overall flow of operations for robot 100. Most work on a farm is controlled by a general farm production plan. This plan describes the fields, the results of soil tests, crop history in that field, drainage and the like, marketing arrangements, and a detailed schedule of activities and resources required through the year. This plan is guidance to the operator in scheduling operations on a daily or hourly basis including hiring personnel, purchasing supplies and the like, as well as providing planting, cultivating, spraying, harvesting and other dates and operations descriptions.

Many if not all portions of a plan can now be stored in the management computer 370 (step 401). When the plan specifies that a particular operation is to be performed in a particular field 110 using the robot 100, a pre-processing routine is begun through work order processor 372. First, an operator enters or selects a work order 371 through I/O devices (not shown) at the management computer 370 (steps 402–403).

Work order 371 identifies the overall robot operation to be performed. Work order 371 includes data and start time parameters (optional), robot control functions (e.g. velocity and turning radius parameters), a description of the layout to be followed by the robot (e.g. baseline, corners, row width and length), the number and type of implements used (e.g. each implement name), and control instructions for operating each implement along the layout (e.g. material, rate, depth and other implement and operation parameters).

Table A below shows a sample work order for laying out parallel rows 30" apart for planting and fertilizing in a "planting with pop up" operation scheduled on May 26, 1997 at 8 a.m. The robot is to move with a velocity not to exceed the given maximum and to execute turns of a given minimum turning radius. Two implements are used, a planter #2 and a liquid fertilizer applicator. The planter is started three feet from the top of a row (+3) and ended two feet from the bottom of a row (−2). When operating, the planter is to plant snap bean variety A21 seed at a separation rate of 3" and depth of 1". The fertilizer applicator is started two feet from the top of a row (+2) and ended one foot from the bottom of a row (−1). When operating, the fertilizer applies 18-46-0+25K liquid type fertilizer at a rate of 20 grams/per application (or squirt).

TABLE A

WORK ORDER SAMPLE

| Textual Description | Data Field(s) |
|---|---|
| Date of operation | 5/26/97 |
| Start Time | 0800 |
| Row width | 30" |
| Velocity maxima | |
| Turning radii minima | |
| Layout | |
| base line | p1, p2 |
| corners | p1, p2, p3, p4 |
| start impl 1 at | +3 in row |
| stop impl 1 at | −2 in row |
| start imp 2 at | +2 in row |
| stop imp 2 at | −1 in row |
| Operation planting w/popup | |
| implement | planter #2 |
| material | seed, snap beans A21 |
| rate | 3" |
| depth | 1" |
| implement | liq. fert. applicator |
| material | 18-46-0 + 25K |
| rate | 20 g/a |

Data is entered for a particular point including the x and y coordinates (and z if necessary) of points in a layout 110, a control function (func), velocity (vel) of the robot, and implement control function (datum). The control function relates to a series of commands for controlling the operation and direction of the robot movement, including, but not limited to, start, stop, park, shut-down, forward, reverse, and right and left fillets (standard and tangential). The implement control function relates to a series of commands for controlling the work performed by one or more implements 360 including, but not limited to, commands for engaging and disengaging the implement at a point. Additional column(s) can be provided for identifying other information as needed for a particular work operation. For instance, when more than one implement is attached to the robot 100, a unique identifier can be used in the work order to identify a particular implement being referenced. Descriptive information identifying a crop, field, start time, and field operation can be listed.

Work order information can be input directly by a farmer or operator through a user-interface into computer 370 by keyboard or other user-input. An operator can input the route the robot is to take through the field, the speeds, turning radii, implement control points, and other parameters in terms understandable to a conventional database program package (or a customized program) that builds a work order data file based on the user inputs. For example, a user can fill in blanks on a work order template form display. Other graphical user-interface aids can be used to facilitate data input and to build a new customized work order data file. The work order data file is stored in library of a database 373 and can be displayed (steps 404, 405, and 410). Existing work order data files from a pre-existing data file or file library for database 373 can also be selected and/or modified (step 406).

W.O. processor module 372 converts the work order 371 to a scenario 334 (step 407). For example, W.O. processor module 372 automatically converts the data entries of a work order 371 as captured in a data file into a scenario data file 334. Scenario data file 334 contains data representative of a predetermined path to be followed by the robot through a pre-defined area within the garden 110. The predetermined path, composed of route segments, is drawn by the pre-processor module 372 to follow the points listed in a work order. In one example, the points in a work order are converted to precise start and end point of respective route segments forming the predetermined path. The scenario (or work order) includes the initial route segments for moving the robot from a shed 150 to within the garden area 110.

The scenario further identifies specific operations to be performed by the implements carried by the robot at points along the predetermined path defined and associated with each segment. Data items in the scenario include driver motor control data, primarily when to change velocity of each track at what rate, points at which implement controls are to be actuated, data to be recorded during the task (error reports and status reports), location of special events and termination instructions (what to do at the end of the path). The robot 100 can then be started, driven in a straight line, turned, reversed, and stopped, in accordance with the driver motor control instructions accompanying corresponding route segments. For example, prior to an intersection of route segments, outer wheels can be made to accelerate relative to inner wheels so that the outer wheels rotate more quickly causing the robot to begin a turn of a specified radius, in a known process called "filleting." The implement control instructions depend upon the particular work operation, e.g., lower implement, drop container.

Interrupt procedures can modify or suspend the operation of the robot 100 when on-board supplies need to be replenished or a bin capacity is reached. Special events can be identified and recorded during the course of the robot's operation, such as, recording a point on a route segment where filled containers were dropped off, or spray was exhausted. In this way, after a refill is made, the robot 100 can restart at the same place.

As mentioned above, the scenario 334 can be built automatically during pre-processing by the work order processor 372. The scenario's predetermined path and control operations can be displayed as a map of the garden 110 to allow easy checking by the farmer for accuracy and completeness (step 408). Like the work order, the scenario can be modified and stored as a new scenario data file (step 406).

Further, a scenario can be built for many types of work orders presented with varying degrees of data points and abstraction. For example, a simple garden pattern having a large number of parallel rows with ends which lie on a pair of perpendicular lines can be entered as a work order which only contains data representing a pre-defined rectangle and the spacing between rows as shown in the above Table A. The pre-processor module 372 accepts this high-level description and produces the actual rows as a collection of points at which velocities are changed. Route segments at each end of row pairs are linked with standard fillets and with standard start and terminate drive motor control sequences in forming the scenario.

Work order processor module 372 stores scenario 334 on a disk for transfer to the robot computer system 330 (steps 411, 412 and 413). Scenario 334 is also stored in database 373 (or other memory or storage device) with work order 371 and various messages or reports generated by robot 100 or remote components of the system during a previous use in the management computer. A startup check list corresponding to the scenario 334 is printed for the operator.

Before start time is reached, the floppy disk is inserted into a disk slot on the robot 100 (steps 412 and 413). The farmer, using the checklist, fuels the cart, attaches the correct implement, loads any supplies required, starts the computer 330 and presses a start button on the control panel. Scenario 334 is read into the on-board computer's memory. While use of a floppy disk to transfer the scenario from remote computer 370 to the on-board computer system 330 is preferred for convenience, any other technique can be used, such as, downloading the scenario via communication link or inserting an electrically-erasable programmable read-only memory (EEPROM) loaded with a scenario. Preparation of the work order and a corresponding executable scenario is preferably done "off line" in the management computer 370 (work order processing module 372) rather than in the on-board computer 330 in order to balance the computing load, minimize size of the on-board system 330, and to permit centralization of library files.

When the on-board computer 330 reaches a start time, operation of a scenario begins (step 414) and the robot 100 is started (step 415). The scenario is executed (step 416). In an unexpected event occurs (step 417), a record 418 is made for a report. If action is required, manual operation can be performed (step 420) and the scenario continued.

When the scenario is complete (step 421), a signal manager sub-module notifies control program 332 to shut down robot 100 (step 419). The manager can then retrieve a disk containing reports generated by the computer 330 during scenario operation for review (steps 422 and 423).

During execution of the scenario, calls are made to navigation module 338 to determine a navigational fix for the robot 100 as described below.

FIG. 5 is a flowchart showing a Control Operation 500 carried out by Control Module 337. In step 510, robot 100 begins to perform a scenario stored in memory 334. For clarity, an example garden layout as shown in FIG. 1 will be presumed to be described in the stored scenario. Alternative layouts and designs can be used. If a start time is included in the scenario, the computer system 330 waits until the start time is reached before beginning further robot operation.

In step 520, the robot 100 travels from a shed 150 to the head of the first row of the garden 110. In general, the beacons 121–127 are started at the time robot begins to move and continue to flash until the robot has completed its work.

Calibration (identifying the exact locations of the lights when newly installed) is performed automatically in a special operation before robot is used for gardening operations. Preferably, calibration is performed once for a work area when beacons 121–127 are installed or adjusted. Any conventional manual or automatic surveying techniques can be used to determine positions of the lights with respect to a work area. For example, position coordinates for all beacons can be measured directly by surveying, tape measure, or other measuring techniques.

Alternatively, to reduce the number of manual measurements, the positions for two or three calibration beacons, e.g. 121–123, are measured manually and stored in the robot 100. One beacon's location is defined to be the origin of the coordinate system of the field. The location of a second beacon relative to the first establishes a base line relative to which all other components of the system are located. The robot is then moved during calibration in the work area or field and detects beam spots corresponding to the beacons 121–127. The robot is directed during calibration to move in a straight line near the three calibration beacons 121–123. By a process of successive approximation and "traverse closing," known to land surveyors, the locations of the other beacons 124–127 can be found relative to the calibration beacons 121–123. In effect the procedure is the inverse of that used when the robot is using the beacons to navigate through the field as explained below. Thus, the need to separately survey the beacon system to determine a calibration reference point or to provide an absolute position for each light is not required.

In step 530, navigation interrupts are received periodically from the beacon controller 374. Control is thereupon transferred from the control module 337 to the interrupting module. Other kinds of interrupts can be received such as implement service required, end of path reached.

If a navigation interrupt has been received, the beacon controller 374 has issued a radio signal indicating that it has turned on its lights. The CCD camera image is read into RAM and the chip resets (step 532). This first CCD image output represents detected ambient background radiation and seven beam spots corresponding to the beacons 121–127. After a short interval (e.g., 30 milliseconds) the lights have been turned off and the CCD camera 324 is read again to obtain a second CCD image. The second CCD image shows only background radiation (step 534). The first image is subtracted logically from the second image to produce a third CCD image that is essentially a blank array except for the beacon light spots (step 535). In 30 milliseconds, at a velocity of one foot per second (0.68 mph) the cart will move ⅜ths of an inch which is small enough to not effect the background image position significantly. Integration and other techniques can be used to essentially "freeze" the effective first and second CCD images so that the images allowing the background radiation to be subtracted even more effectively.

In step 536, a call is made to navigation module 338. Navigation module 338 then calculates a navigational fix of the robot from the third CCD image of the detected beam spots. This navigational fix can include position (x,y,z) and orientation (pitch, roll, yaw). In one preferred example, the navigation fix need only include location (x,y) and heading (yaw) information.

In step 537, control is switched back to the control module 337 which receives the detected navigational fix from the navigation module 338. In step 538, the actual position and orientation as determined in the navigational fix are compared to expected position and orientation information. The expected position and orientation information is specified in the scenario.

In step 540, the course of the robot is corrected when the difference between the actual and expected position and orientation of the robot exceeds predetermined threshold levels. (This can be done for location (x,y) and heading (yaw) only—tilt is determined by the underlying terrain and cannot be changed although it may affect course since the implement may not be directly under the robot center.) In particular, changes are made to the velocities of the robot's tracks as designated by feathering algorithms (or other robotic movement algorithms) to return the robot 100 to the predetermined path defined in the scenario. This correction step can include adding additional route segments to the scenario to correct wide departures form the predetermined scenario layout path. Such corrective control for drive motors 350 is well-known and need not be described in further detail.

The control of the point of contact location of a work implement 360 and/or control of its operation is also corrected, if necessary, based on the comparison of the detected navigation fix position and orientation information and the scenario being performed. The course of the robot travel and the operation of a work implement 360 are corrected through servo-control to adhere to the scenario (step 540).

When a navigation interrupt is not received in step 530, or when a course correction has been made in step 540, the control module 337 continues the present route segment or reads the next route segment (step 542). In step 544, if the scenario is not yet complete, the control module proceeds to step 530; otherwise, work operation ends in step 550.

Emergency remote control operation can be provided via radio link 378 at a remote office 140 outside the garden 110. Although intervention by the user by remote control is rare, since the course to be followed is a closed loop, the farmer can control the robot by remote control in the event of unexpected conditions or emergencies. For example, the farmer can send remote control commands, such as, "STOP" or "SELECT A COURSE TO RETURN TO SHED," to override the robot's movement and operation anywhere within the garden 110. However, because the capabilities of the on-board computer to deal with abnormal situations can be increased indefinitely, only remote-control of unexpected events need be provided.

Optical Position and Orientation Detection

The operation of the navigation module 338 in detecting position and orientation information covering six degrees of freedom will now be described with respect to FIGS. 6A–C and 7. FIG. 6A shows an example of the geometry between an optical unit 600 and navigation beacons 121–127 according to the present invention. The optical unit 600 includes a panoramic image collector 610, a focusing lens 630 with focal length fh, and a two-dimensional imaging camera 650. Seven beacon lights 621–627 are placed around the garden or work area 110 and connected through beacon control box 375 to a central power supply (not shown). As described earlier, the lights are turned on for 30 milliseconds every second or two. Higher or lower duty ratios and higher or lower switching rates can be used. Beacon control box 375 also sends a radio pulse to the robot 100 when the lights are turned on. The robot 100 is slave since several robots can work the same field (set of lights) at the same time and light flashing cannot be private to one cart.

An advanced instrument grade CCD chip 650 made by Kodak has 4 million square, contiguous pixels. Resolution in the center of a ten acre square work area, given 8 lights, permits the determination of location of the cart to about ⅜" on average. Image processing methods exist to further reduce this error. Computer simulations show that in a small field of one acre, the error is close to approximately 0.1", more than sufficient for this application.

In one example, the panoramic image collector 610 is a conical reflector. The conical reflector consists of a vacuum plated plastic right cone, tip down along the optical axis of the camera focusing lens 630. The enclosed angle of the tip is π/3 radians providing a circular image to the camera about 30 degrees above and below of the horizon and covering 360 degrees horizontally. The image of the lights on the chip is a collection of n (n≧7) points arranged in an approximately circular pattern.

As shown in the example of FIG. 6A, the rays 621–627 are emitted from each of the respective navigation beacons 121–127. Rays 621–627 reflect from a panoramic image collector 610 and pass through a focusing lens 630 to form seven distinct beam spots on a two-dimensional CCD camera 650. Since the optical unit is fixed to the cart whose vertical axis varies depending on the roughness of the terrain, the images in the camera are displaced not only as a consequence of location in x,y and z but also of pitch, roll and heading of the cart, essentially six degrees of freedom.

Figure 6D:
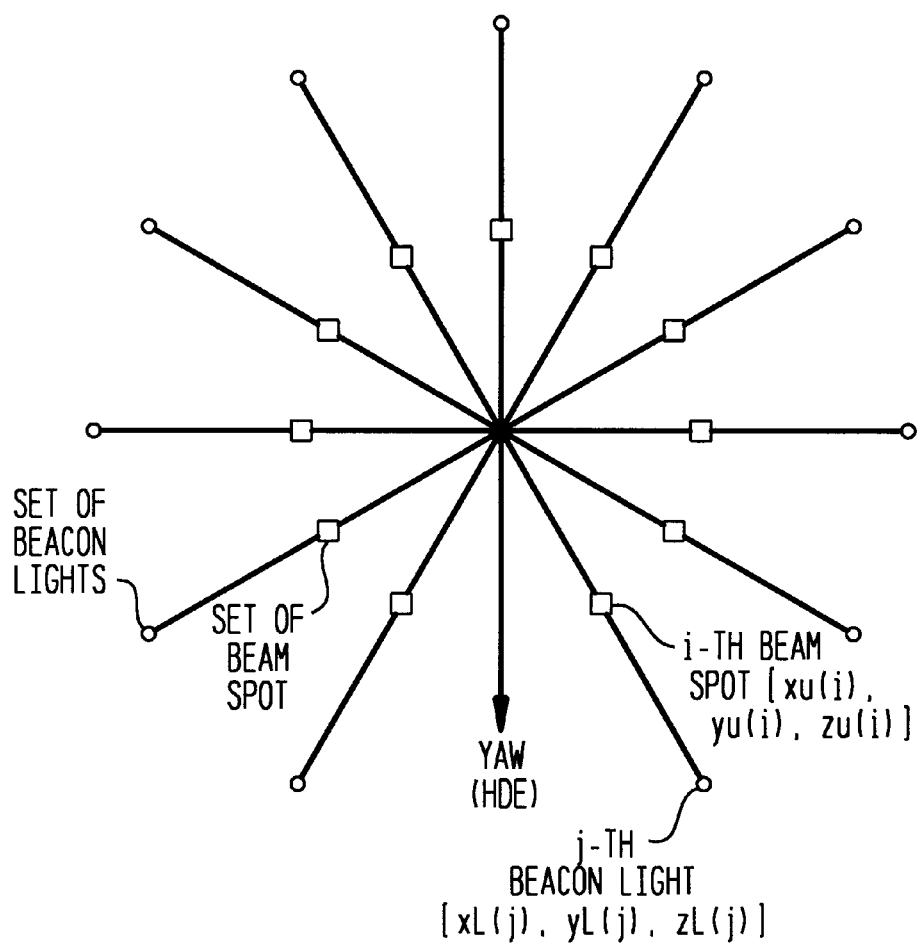
FIG. 6D shows a flat perspective view of the positions of a set of lights relative to a set of detected beam spots.
Figure 6B:
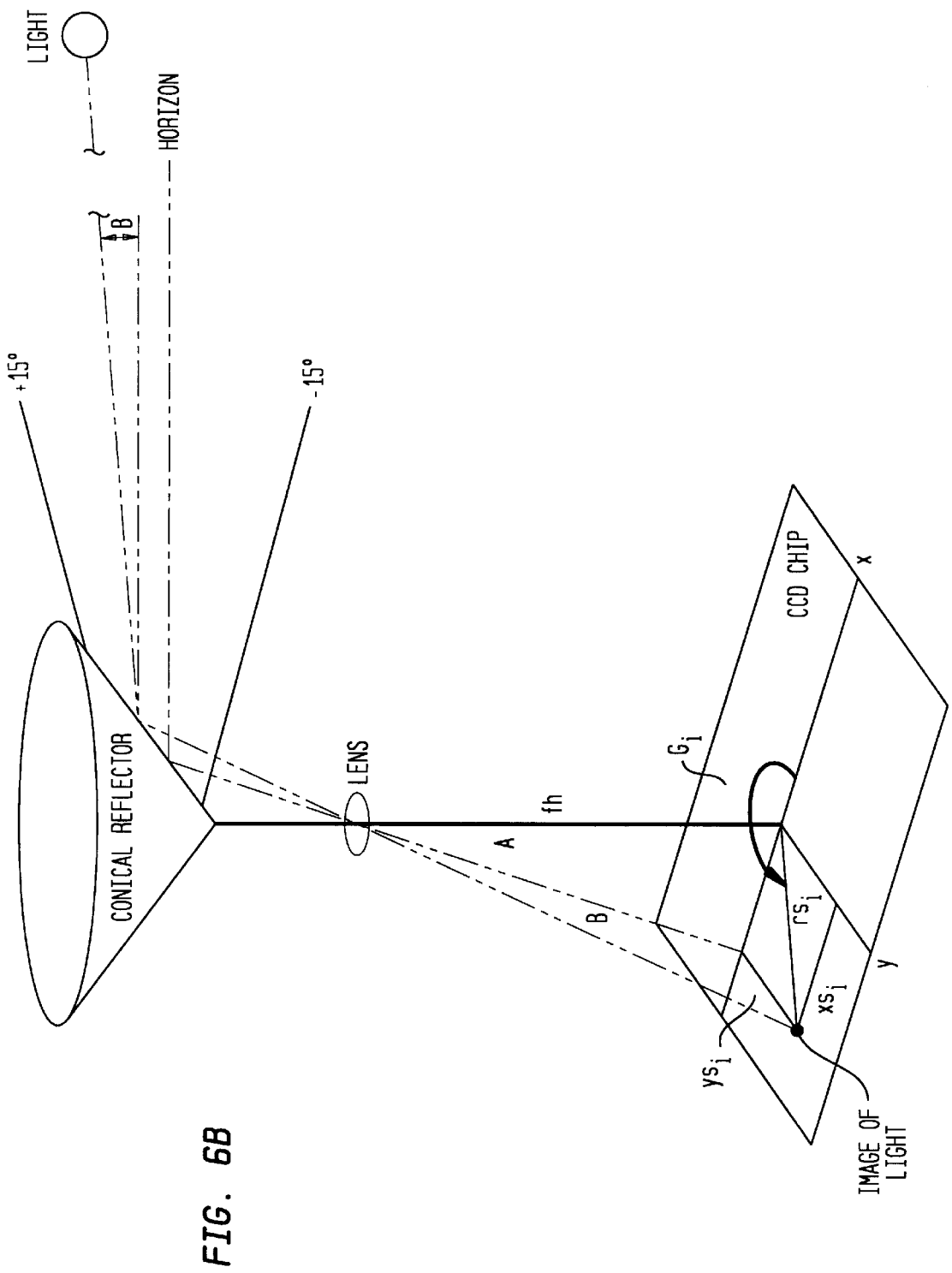
FIG. 6B shows in a greater detail the path of one beacon light ray through an optical unit to an imaging camera in the present invention.

FIG. 6B is a diagram of a single light ray which leaves beacon i (which has coordinates xl(i), yl(i), zl(i). The ray reaches the mirror 610 at a positive angle B with the horizon (either because the mirror is below the light or because the cart is tilted toward the light). The ray then bounces off mirror 610, leaving the surface at an angle with the mirror surface equal to that at which it arrived (except for sign) and passes through focusing lens 630 into the camera and onto a pixel in CCD chip 650 as the i-th image. The light ray, the point of reflection, lens 630 and the image beam spot all lie in the same vertical plane. The coordinates of an image, xs(i) and ys(i), are determined when the contents of the chip are transferred to the computer since every pixel is numbered. The angle G is the angle of the perpendicular plane passing through the image to the x axis of the chip. From the standpoint of the optical unit, its orientation is perpendicular. Tilting or rotation has the effect of making the lights wander around in the "sky" but this wandering has no effect on G which is an honest representation of where the chip thinks the light is. That is, $$G(i)=\text{ATN }(ys(i)/xs(i));\qquad\qquad(I)$$

where ATN represents an arctangent function. Likewise, the angle above or below the horizon of the light moves the image in or out along line rs an amount such that $$rs=fh*\text{TAN }((B+A);\qquad\qquad(II)$$

where A is the angle of an image exactly on the horizon, which is determined by the angle to the perpendicular of the surface of the cone. Hence the angle B+A is simply the arctangent of rs/fh, or $$B=\text{ATN }(rs/fh)-A.\qquad\qquad(III)$$

From these two angles, B and G, for each of the 7 images, the roll, tilt and yaw of the cart can be found and from these three values, its position can be found, as described in the next section.

Figure 6C:
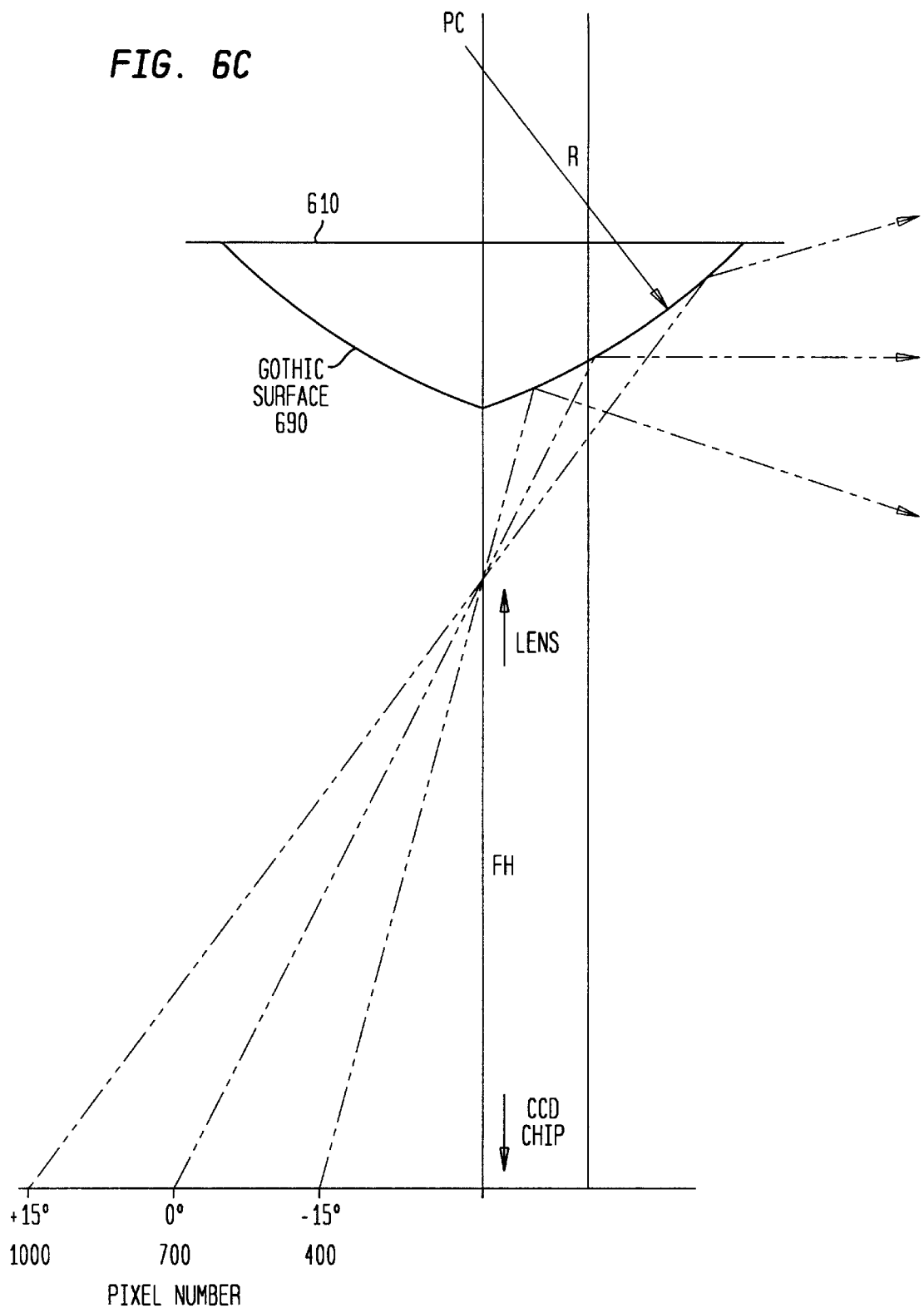
FIG. 6C shows a "Gothic" reflector used in one embodiment of the present invention.

As a point moves in or out along a radius of the chip because the light is higher or lower in the "sky" as seen by the camera, the number of pixels it moves is not proportional to the angular difference because of the spherical aberration induced by the flatness of the chip—the "pin-cushion" effect. However, if the regular cone is replaced by a conical shape whose surface is a rotated arc of a circle, the rate of change of B and of pixels tends to converge to a constant, increasing the use of pixels more distant from the center, in effect reducing the pin cushion effect. Such a cone can be said to have a Gothic surface. FIG. 6C shows an example of a reflector mirror 610 having a Gothic surface 690.

Figure 7:
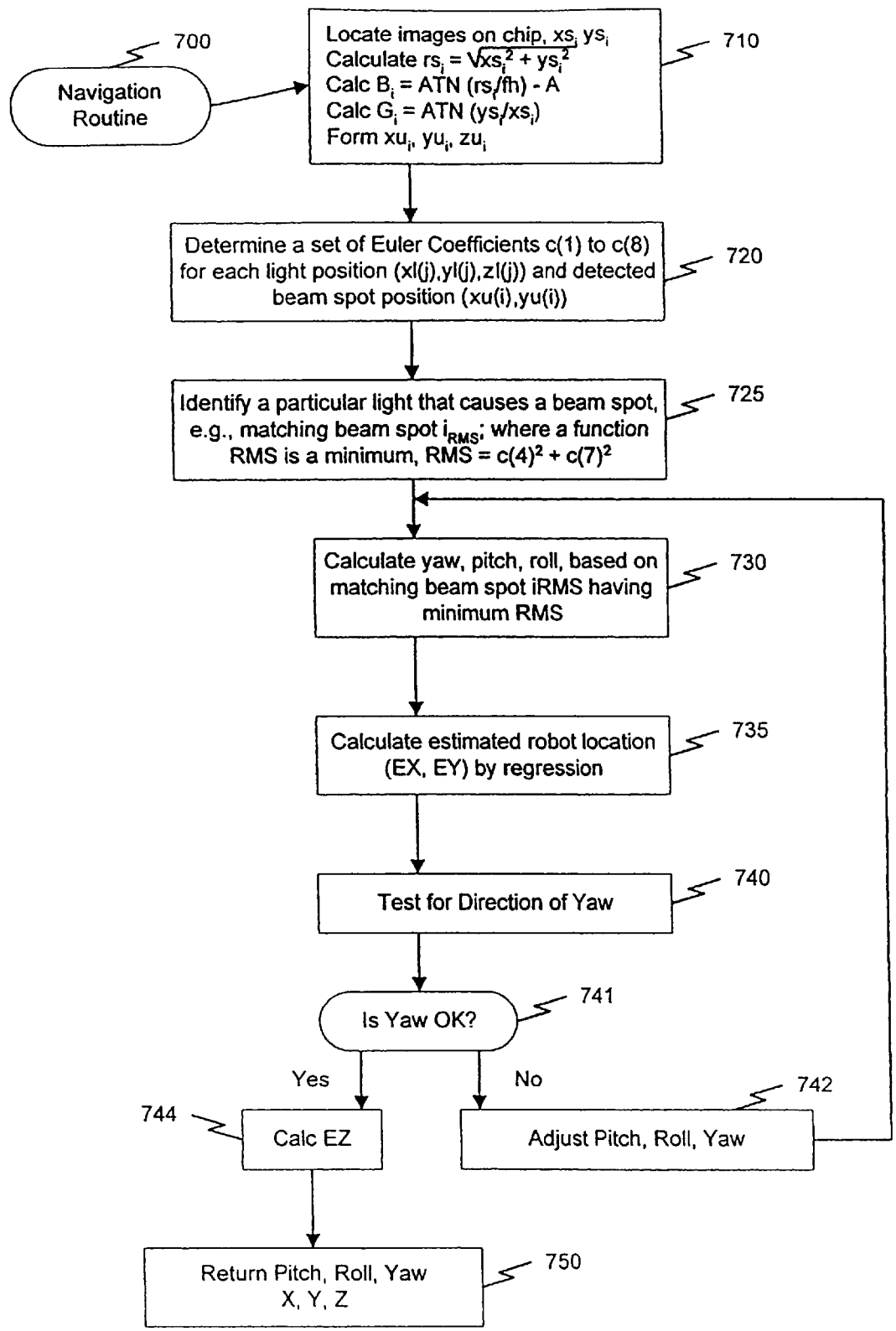
FIG. 7 is a flowchart illustrating a navigation algorithm for calculating position and orientation information according to the present invention.

FIG. 7 is a flowchart of a navigation algorithm 700 used in navigation module 338 to determine position and orientation of the robot 100 based on a third CCD image containing n beam spots (where n corresponds to the number of detected beacons and is equal to or greater than seven). When navigation module 338 is called in step 536, routine 700 begins. Navigation routine 9000 shown in FIGS. 9A to 9D is a more detailed example of an implementation of the navigation algorithm of FIG. 7. These navigation algorithms 700 and 9000 are illustrative. Navigation of the robot 100 in the present invention can include, but it not limited to, either of the example algorithms described with respect to FIGS. 7 and 9A to 9D. Given the example navigation algorithms 700, 9000 and the detailed discussion described below, one of ordinary skill in the art would be able to make and use the present invention.

In step 710, the n beam spots from the third CCD image are read to determine the locations of the n beam spots. A set of n pairs xs(i),ys(i) and sets of n angles G(i) and B(i) are calculated according to equations (I) to (III) above. Using the focal length of the camera, fh, three additional numbers, xu(i),yu(i) and zu(i) are constructed which are the spherical coordinates of the lights for a first beam spot j (xl(j),yl(j), zl(j)) transformed to the coordinate system of the cart (see steps 9100, 9110, and 9120).

However, the first spot i (i=1) is not necessarily the image of the first light (j=1) in the list of lights stored in the computer. Thus the next step is to find the entry in the list of light coordinates stored in the computer which corresponds to one beam spot, e.g., the first beam spot image to the right of "east" on the chip, as shown in FIG. 6D.

First, as discovered by the inventor, a set of Euler coefficients c(1) to c(8) is determined for each beacon light coordinate (xl(j), yl(j), and zl(j)) and detected beam spot position coordinate (xu(i), yu(i)) (step 720 and steps 9200, 92220, 9222, 9224, 9226). If there are more than 7 lights visible and catalogued then an n-entry regression with 7 variables is used otherwise a seven variable set of simultaneous equations is used. The independent variables used, functions of the image coordinates and light coordinates, and resulting coefficients c(1) to c(8) are discussed in even further detail below. This set of equations is solved by rotating the set of lights relative to the set of images and solving for the variables using those two sets since both are known to be ordered clockwise.

Next, the particular light that causes a beam spot is identified (step 725 and steps 9227, 9228, and 9229). In other words, a match a beacon light and a corresponding beam spot is determined. As first recognized by the inventor, a match between the set of lights and the set of beam spots typically occurs in a regression where the function RMS is a minimum, where RMS equals the sum of the squares of coefficients c(4) and c(7) (step 725 and steps 9227, 9228 and 9229). Once a match between the set of lights and the set of images is found, the index of the light corresponding to the first spot to the right of the positive x axis of the chip is labeled "irms." Subsequently (until the picture is changed) for any i, the corresponding light j=(i+irms−2) mod n+1.

In steps 730 and 9300, the matching beam spot i having a minimum IRMS is used to extract from coefficients c(3), c(4), and c(7) the values of yaw (also labeled QAW), pitch and roll. The Euler functions of these angles are then calculated and another set of simultaneous equations, with xu(i),yu(i) and zu(i) as independent variables is solved returning the coordinates the images would have if pitch, roll and yaw were zero (steps 9350, 9400, and 9420).

In step 735 and corresponding steps 9500, 9510, 9520, 9540, and 9560, the values of Ex and Ey, the estimated location of the cart in the plane in terms of the lights are calculated by regression on all n lights where xp(i) and yp(i) are the coordinates of the ith image and xl(j),yl(j) are the coordinates of light j (where j=(i+irms−2) mod n+1):

$$x*yp(i)-y*xp(i)=xl(j)*yp(i)-yl(j)*xp(i).$$

Unfortunately, yaw, the true heading of the cart, is either as given or exactly opposite. Accordingly, a test is made for the direction of yaw (steps 740 and 9600). Since the cart must be heading in a direction such that light(irms) is the first image on the left of apparent heading and light(irms−1) is the first one on the right. Yaw is checked to see if it falls between two angles around the heading (steps 741, 9610, 9620, 9624, 9630, and 9634). For example, two angles $\phi_1$ and $\phi_2$ can be used which are plus and minus 0.5 radians respectively about ATN (EY−YL(IRMS)/XL(IRMS)−EX).

If yaw is not an angle contained in this gap (increased slightly to handle errors induced by tilt) then yaw must be wrong by 180 degrees and the signs of pitch and roll must be adjusted, e.g., reversed (steps 742, 9622, 9626, 9636, and 9640). If so, the correct value of yaw is calculated by returning to steps 730 and 9350 with reversed signs for pitch and roll and subtracting π from yaw (steps 742 and 9640).

If yaw is within the gap (or smaller angle) formed by the two rays to the lights which bracket the positive x-axis of the chip or has been adjusted, the routine proceeds to calculate an estimated Ez value:

$$ez(i)=zl(i)*xp(j)-zp(j)*(xl)(i)-x)/xp(j)$$

where i is the index of the spot and j the index of the light (steps 744, 9625, 9632, 9635, 9639, 9700, 9720, 9800, 9820, 9830, 9840, 9850, and 9900). If ez(i) is less than a lower bound or above an upper bound, it is rejected. Otherwise its value is summed and the total averaged to give a best estimate of ez. Values may be rejected because the robot is close to the edge of the field(steps 9830, 9840, and 9850).

Finally, the resulting values of ex,ey,ez, yaw, pitch and roll are returned to the control module 337 where they are used to correct the course if necessary (steps 750, 9920, and 9950).

Figure 8:
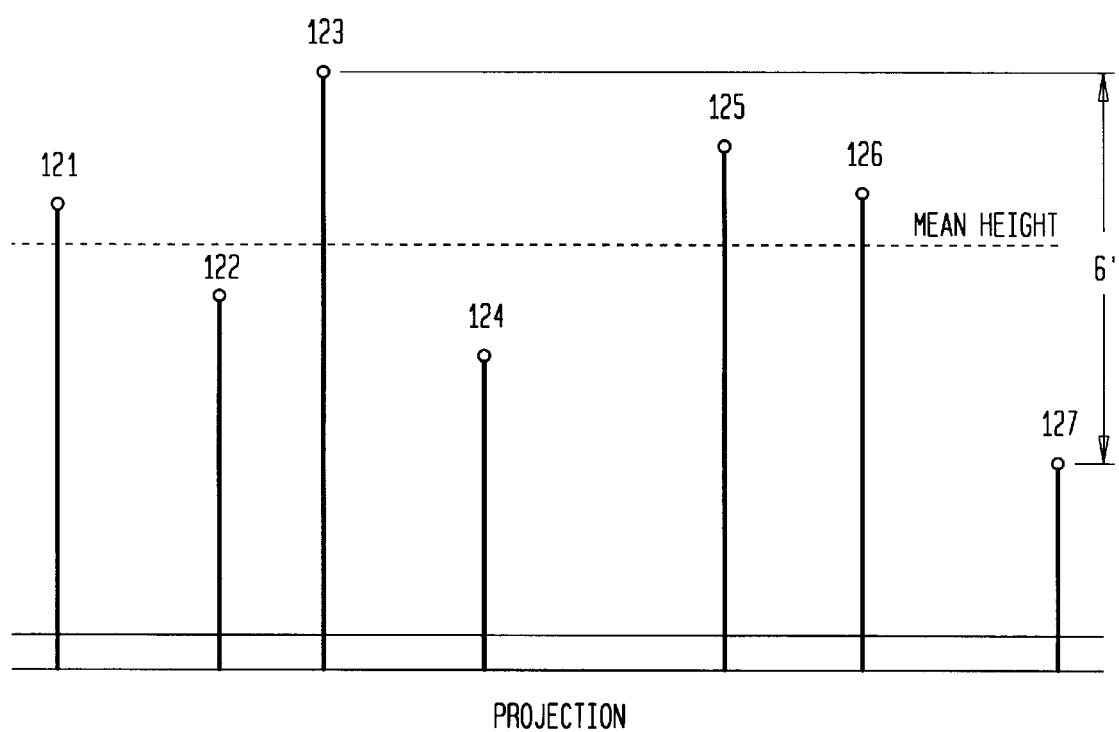
FIG. 8 shows a preferred distribution of beacon heights according to further aspect of the present invention.
Figure 9A:
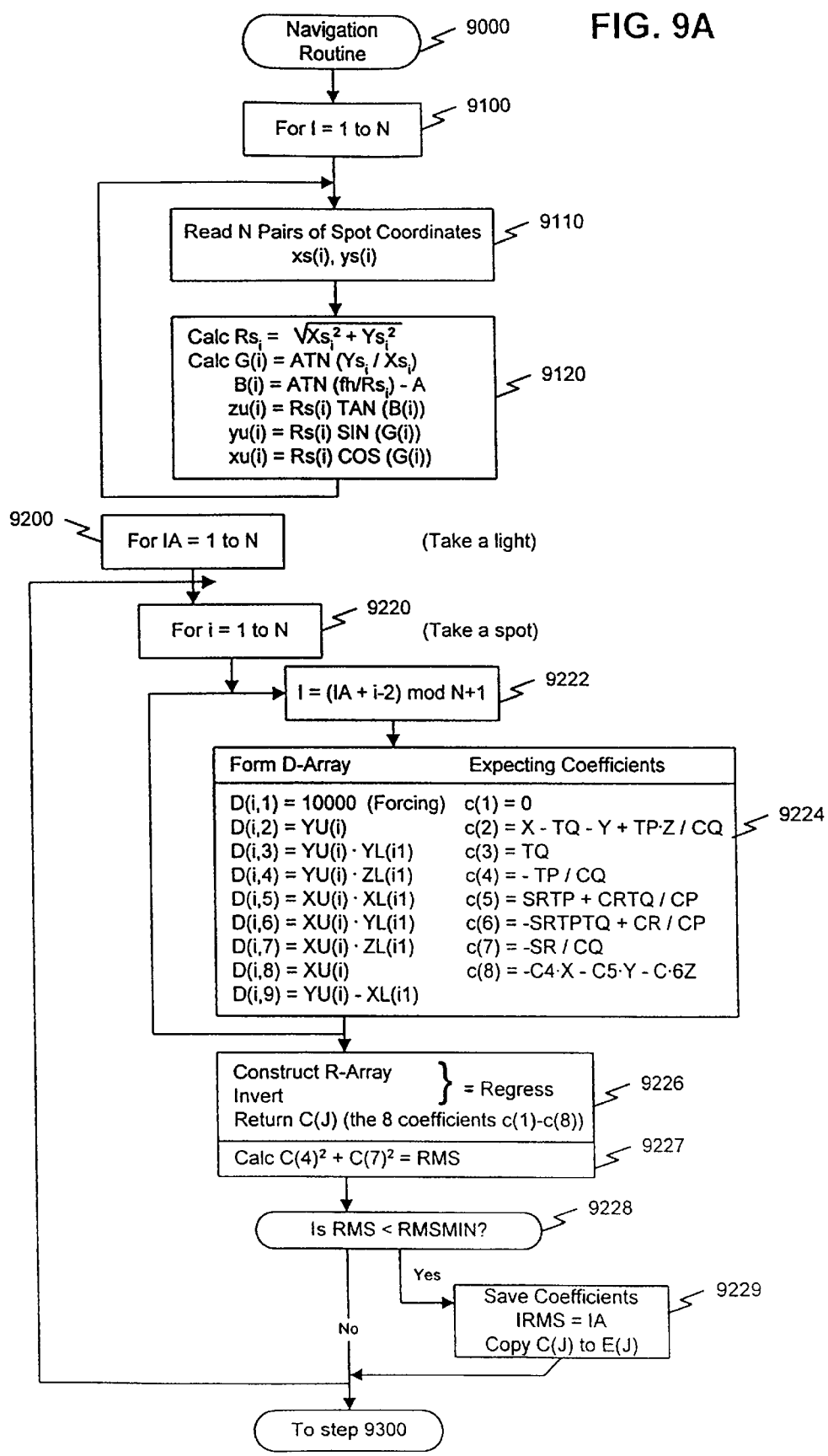
FIGS. 9A, 9B, 9C, and 9D are flowcharts illustrating an example of the navigation algorithm of FIG. 7 in more detail.
Figure 9B:
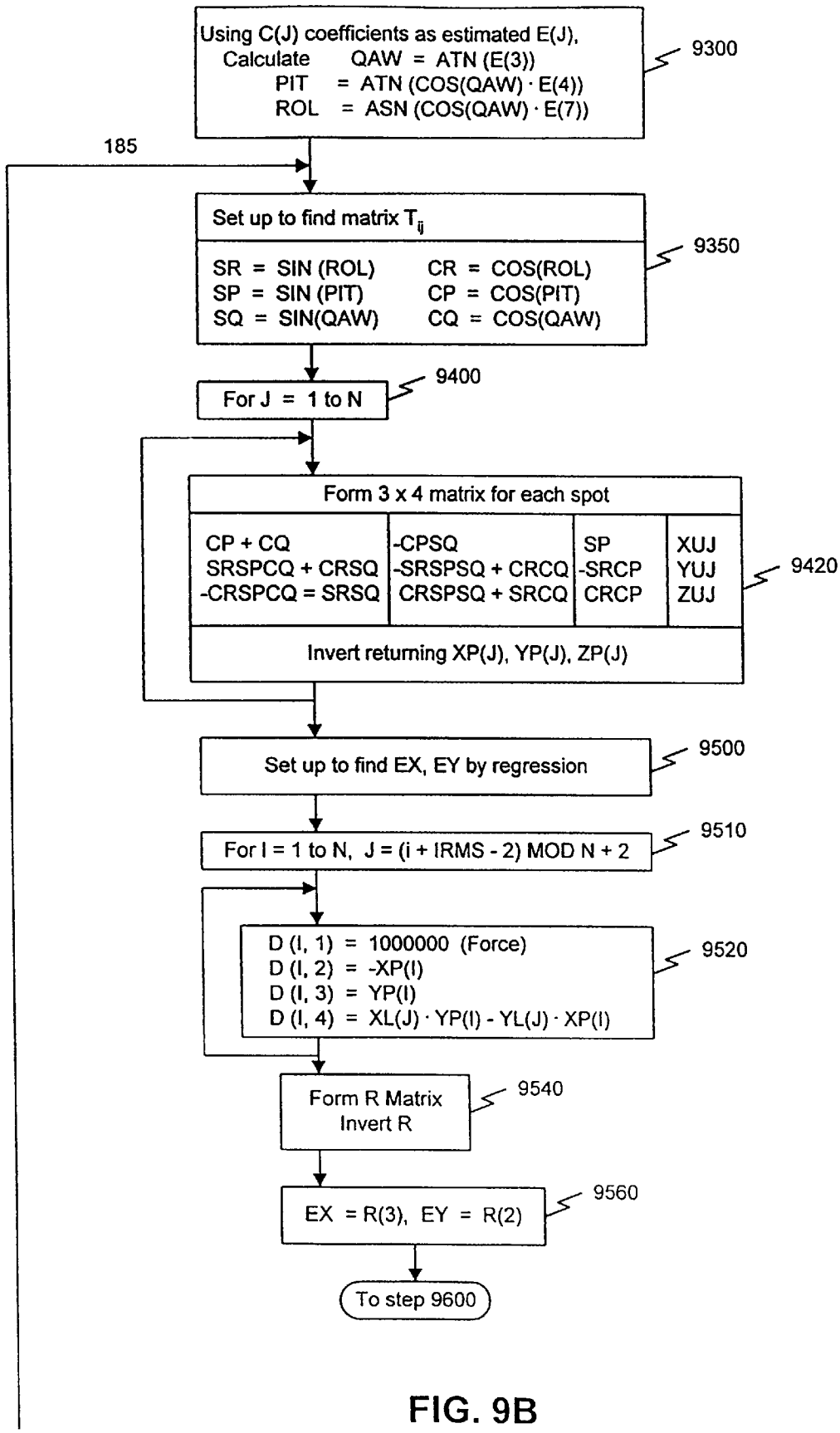
Figure 9C:
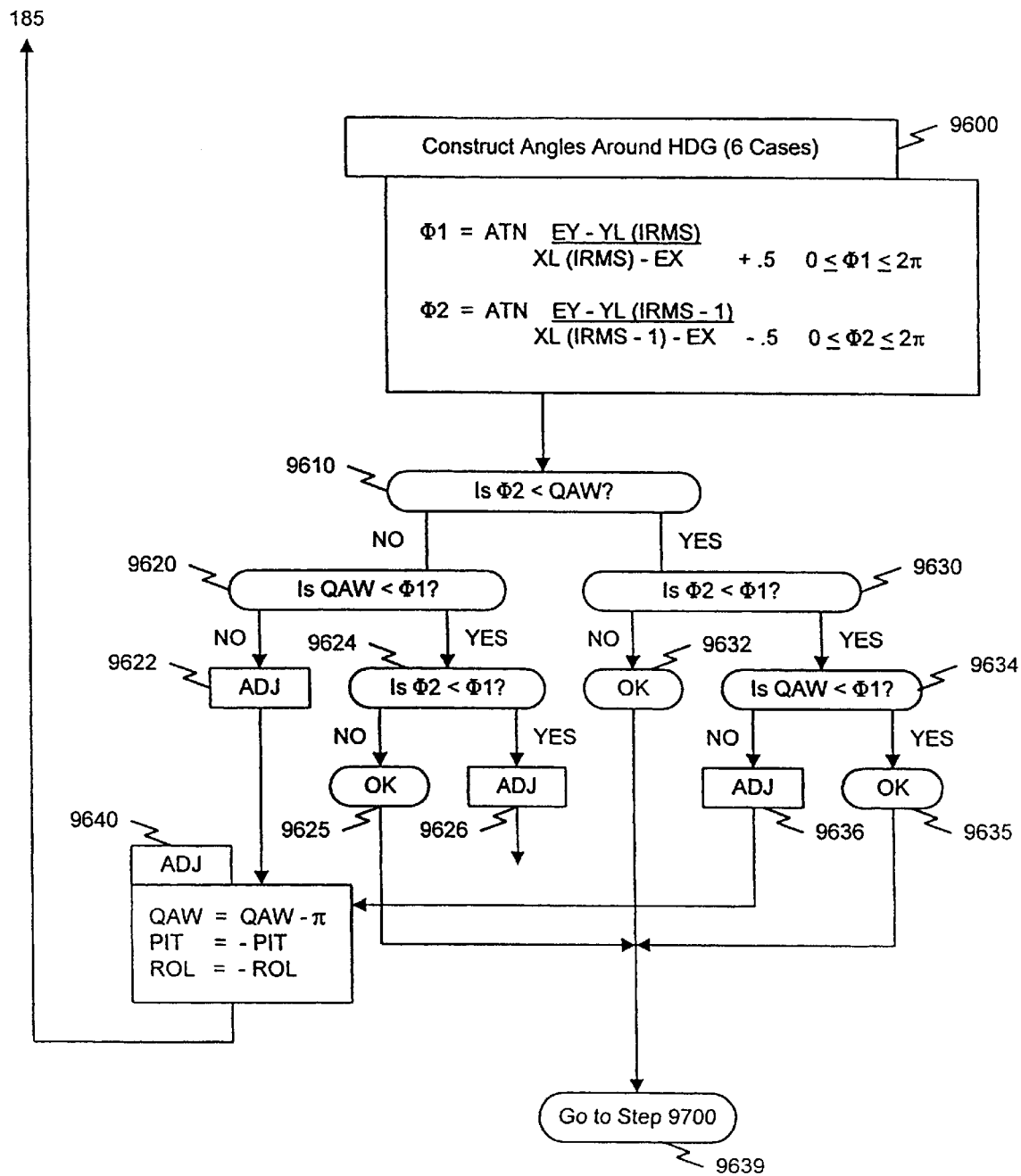
Figure 9D:
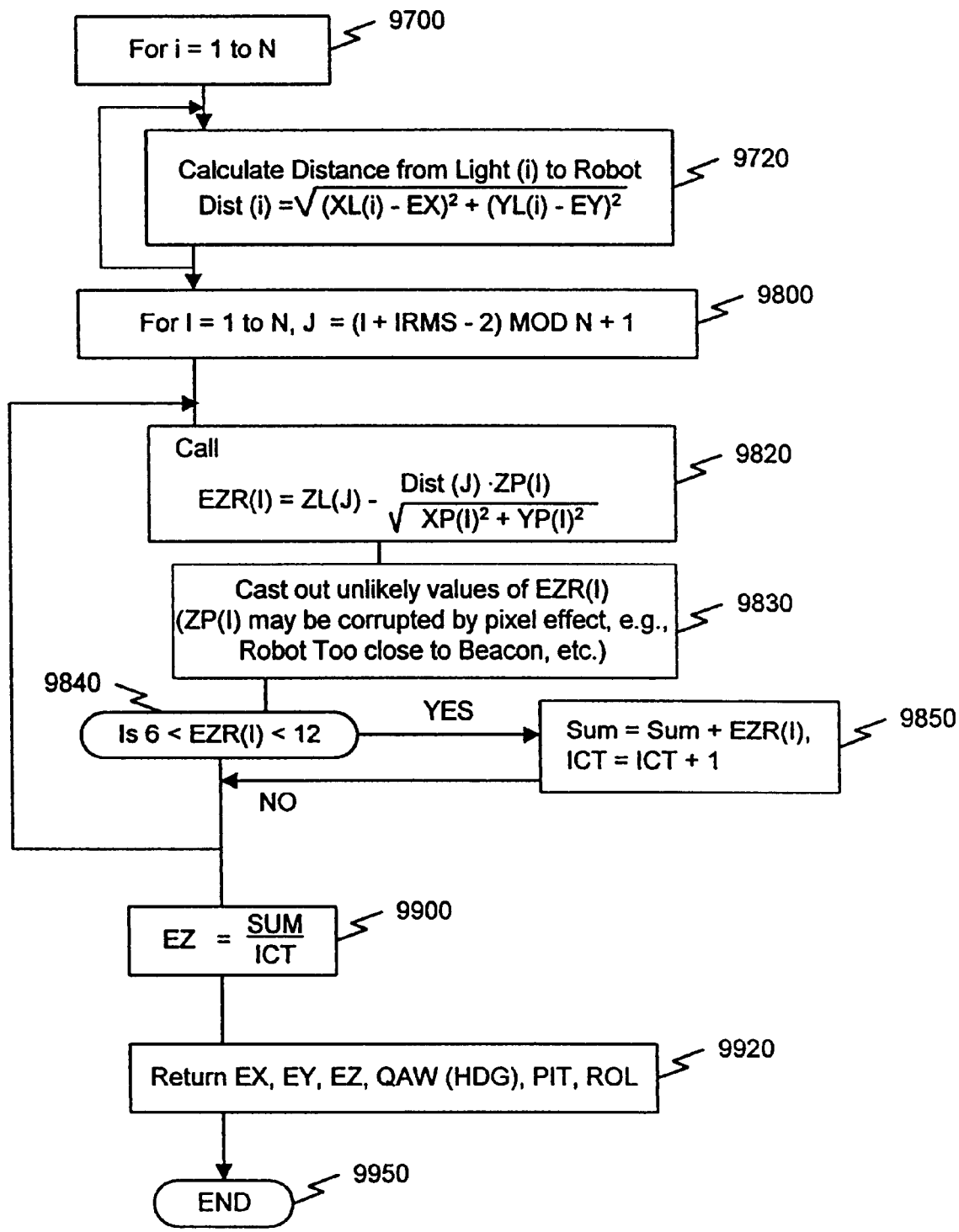

FIG. 8 shows an example distribution of emitters 121–127 having varying heights within a range according to a further feature of the present invention. Preferably, the heights of emitters 121–127 are distributed within three feet above or below a plane which is the least best squares fit to the lights. By varying heights of the emitters relative to one another, pixel error is reduced and accuracy increased.

Detailed Description of the Navigation Algorithm

Information available to the navigation algorithm 700, 9000 are the xs(i), ys(i) coordinates of the N light images on the chip and tabulated coordinates of the light(j) determined at calibration (or prestored at the time of beacon set-up). The value of n is at least 7 but accuracy improves with n greater than 7 up to about 14 at which number the contribution of additional lights is not significant.

Each j corresponds to some i but the correspondence is not known. These image locations are the final result of the rays from each light being reflected off the conical mirror into the camera which has a focal depth of fh, and the CCD chip whose characteristics are known (pixel shape and number, for example). If the light is above the apparent horizon of the cart, the spot is further from the center of the chip.

Referring to FIGS. 6A–C, the following variables exist:

| | |
|---|---|
| $B(j)=ATN\ (ddz(i)/(SQR\ (ddx)(i)^2)+(ddx)(i)^2)$ | (1)a |
| $G(j)=ATN\ (ddy(i)/ddx(i))$ | b |
| $rw(j)=abs(fh*TAN\ (A+B(j)))$ | c |
| $ym(j)=rw(j)*SIN\ (G)j)$ | d |
| $xm(j)=rw(j)*COS\ (G(j))$ | e | where ddx(i),ddy(i),ddz(i) are the transforms of xl(i)−x, yl(i)−y, zl(i)−z induced by the pitch, roll and yaw of the cart and its camera, A is half the apex angle of the cone, about 54 degrees, fh is the focal length of the chip, set arbitrarily to 100 mm. The relation of i to j is unknown except that each set is ascending cw, because the lights form a convex hull, the cart is inside the hull and is never upside down. (Convexity of the hull is not crucial as long as there are no two points in the work area between which lights change order.) However, ddx, ddy and ddz are not known to the computer.

The transform array is

| | |
|---|---|
| $ddx(j)=T11*xdd(i)+T12*ydd(i)+T13*zdd(i)$ | (2)a |
| $ddy(j)=T21*xdd(i)+T22*ydd(i)+T23*zdd(i)$ | b |
| $ddz(j)=T31*xdd(i)+T32*ydd(i)+T33*zdd(i)$ | c |

Here $$xdd(i)=xl(i)-x, \; ydd(i)=yl(i)-y \text{ and } zdd(i)=zl(i)-z. \qquad (3)$$

The Tij are drawn from the Euler angles for roll, pitch and yaw (we simplify notation) where p=pitch, r=roll, q=yaw, cp=COS(p), sp=SIN(p), tp=TAN(p), cq=COS(yaw) . . . tr=TAN(roll). Then $$T11=cp*cq \quad T12=-cp*sq \quad T13=sp$$

$$T21=sr*sp*cq+cq+sq \quad T22=-sr*sp*sq+cr*cq \quad T23=-sr*cp$$

$$T31=-cr*sp*cq+sr*sq \quad T32=cr*sp*sq+sr*cq \quad T33=cr*cp \qquad (4)$$

The images of the lights in the camera are the xs(i), ys(i) properly rotated. That is, for processing purposes the computer sees a set of n spots ordered clockwise from the positive x axis of the chip. Each spot corresponds to a particular light around the perimeter of the field, data about which is also ordered clockwise from 1 to n in the computer memory.

The problem to be solved is to determine which spot on the chip corresponds to the first entry in the data base and then, from the n xs(i), ys(i) pairs, to determine the 3 coordinates, x, y and z, and the angles pitch, roll and yaw (heading) plus the index of correspondence, 7 numbers in all.

Call the coordinates of the points on the chip xs(i), ys(i) noting that the value of i does not necessarily equal the index of the data about the light. Call gma(i) the angle whose tangent is ys(i)/xs(i). This corresponds identically to ddy(j)/ddx(j) which gives the clue to the solution. Likewise, we have $$rs(i)=SQR \; (xs(i)^2+ys(i)^2) \text{ and} \qquad (5)a$$

$$bti(i)=ATN \; (rs(i)/fh)-A \text{ so that} \qquad b$$

$$zu(i)=fh*TAN \; (bti(i)), \qquad c$$

$$xu(i)=fh*COS \; (gma(i)), \qquad d$$

$$yu(i)=fh*SIN \; (gma(i)). \qquad e$$

Now let xd=xl(i)-x; yd=yl(i)-y; zd=zl(i)-z. Then:

$$ddx(i)=T(1,1)*xd+T(1,2)*yd+T(1,3)*zd;$$

$$ddy(i)=T(2,1)*xd+T(2,2)*yd+T(2,3)*zd; \quad \text{and}$$

$$ddz(i)=T(3,1)*xd+T(3,2)*yd+T(3,3)*zd \qquad . (6)$$

Since a ray from the origin of the chip to the light j passes through the point xu(j), yu(j), zu(j) then:

$$ddy(j)/ddx(j)=yu(i)/xu(i) \qquad (7)$$

Since the xu(j), yu(j), zu(j)'s are known and the xl(i), yl(i), zl(i)'s are known, then if the T(i,j) can be determined then pitch, roll and yaw can be determined.

Solving (7) for its components, since we have n equations, gives the proper values of pit, rol and qaw if we have properly matched i and j. Omitting i and j briefly, and setting xl(j)-x=xd,yl(j)-y=yd,zl(j)-z=zd we have the equation:

$$\frac{yu}{xu} = \frac{T(2,1)*xd+T(2,2)*yd+T(2,3)*zd}{T(1,1)*xd+T(1,2)*yd+T(1,3)*zd} \qquad (8)$$

Cross multiplying yields:

$$yu*(T11*xd+T12*yd+T13*zd)=xu*(T21*xd+T22*yd+T23*zd) \qquad (9)$$

Dividing through by T11 yields:

$$yu*xd=-yu*yd*T12/T11-yu*zd*T13/T11+xu*xd*t21/T11+ \\ xu*yd*T22/T11+xu*zd*T23/T11 \qquad (10)$$

Setting the ratios of the T's to r's and expanding yields:

$$yu*xl-yu*x=-yu*yl*r1+yu*y*r1-yu*zl*r2+yu*z*r2+xu*xl*r3- \\ xu*x*r3+xu*yl*r4-xu*y*r4+xu*zl*r5-xu*z*r5; \qquad (11)$$

and $$=yu(x-r1*y+r1*z)-yu*yl*r1+yu*zl*r2+xu*xl*r3+xu*yl*r4+ \\ xu*zl*r5+xu*(x*r3+y*r4+z*r5) \qquad (12)$$

The r's are ratios of Euler functions from (4):

$$r1=T12/T11=-cpsq/cpcq=-tq$$

$$r2=T13/T11=sp/(cpcq)=tp/cq$$

$$r3=T21/T11=(-srspcq+crsq)/(cp*cq)=-srtp+crtq/cp$$

$$r4=T22/T11=(crspsq+srcq)/(cpcq)=crtptq+sr/cp$$

$$r5=T23/T11=-srcp/cpcq=-sr/cq \qquad (13)$$

The seven equations of form (12) can be solved simultaneously or if n>7, by regression.

Two terms contain x,y and z, but 5 terms contain only ratios and known quantities, that is, after inversion, the coefficients, the c(i), are $$c(1)=x-tq*y+tp*z/cq$$

$$c(2)=-tq$$

$$c(3)=-tp/cq$$

$$c(4)=sr*tp+cr*tq/cp$$

$$c(5)=-sr*tp*tq+cr/cp$$

$$c(6)=-sr/cq$$

$$c(7)=-aa(4)*x-aa(5)*y-aa(6)*z \qquad (14)$$

(A discussion of Euler angles can be found in Korn and Kom, Mathematical Handbook for Scientists and Engineers, McGraw Hill, 1968, p475 et seq.)

Hence if the 7 equations are solved simultaneously for the 7 lights, the coefficients of terms 2,3,4,5 and 6 that emerge are the values of r1, r2, r3 r4 and r5. The coefficient e2 is r1=-TAN(yaw), or yaw=ATN(-e2). The coefficient e3 is Tan(pitch)/Cos(yaw), or pitch is ATN(yaw*e3) and roll is ASN(COS(yaw))*c5.

(This is the only case of the six possible sets of ratios that produces a single variable followed by simple functions of the other two. The coefficients in all other ratios represent sums or products of functions of the variables and are irreducible.)

Since we know all the xu's and yu's, and in a table have all the xl's and yl's, we can, for each of the possible values of j, solve seven simultaneous equations of the form (8) to produce the values of the coefficients, co(k). Then we recover seven sets of candidates for the original values of p,q, and r:

$$qaw(j)=\text{atn}(co(2)), \quad (15)\text{a}$$

$$pit(j)=-\text{atn}(\cos(qaw(j))*co(3)) \quad \text{b}$$

$$rol(j)=-\text{asn}(\cos(qaw)(j))*co(6)) \quad \text{c}$$

Now that we have seven sets of values q,p and r we reject all but one. The value of j which produces the minimum of the function $(c(j,4)^2+c(j,6)^2)$ represents the correct match, which we label irms. That is, each image I corresponds to light k where $$k=(I+irms-2)\bmod n+1. \quad (16)$$

This case is then tested to determine whether or not yaw is wrong by 180 degrees, an ambiguity due to the two-valued nature of TAN(yaw).

First we find the coordinates of the projections of the images on the fh sphere that would exist if pitch, roll and yaw were zero by applying the Euler functions to the original xu,yu,zu constructed from xs, ys. The Euler angles are Hermitian, meaning that the inverse of the inverse is the original array. That is, the n sets of 3 simultaneous equations $$xu(j)=xp(j)*T(1,1)+yp(j)*T(1,2)+zl(j)*T(1,3)$$

$$yu(j)=xp(j)*T(2,1)+yp(j)*T(2,2)+zl(j)*T(2,3)$$

$$zu(j)=xl(p)*T(3,1)+yp(j)*T(3,2)+z(j)*T(3,3). \quad (17)$$

are solved for j=1 . . . n producing xp(j), yp(j), zp(j) for each j. Then by regression, trial values of location in the plane, ex, ey are found from $$-xp(i)*ey+yp(i)*ex=xl(j)*yp(i)-yl(j)*xp(i) \quad (18)$$

Since the heading goes either between the two lights 1 and n or 180 degrees around from that direction, if the angle formed by the lines from x, y to these two lights does not include yaw (but it should) then the angles must be adjusted.

Because trial values of x and y are used (and z is ignored), the acceptable enclosing angle is increased slightly in each arm to compensate for pixel error in x, y. If error has been found in yaw, then yaw, pitch and roll are adjusted. Y is reversed in direction and because yaw was used to compute pitch and roll, their signs are reversed. Then the entire process beginning at equation (8) above is repeated.

The resulting q is the true heading of the robot within pixel error, roll and pitch have been corrected if necessary while the correct values of ex and ey were computed. From these, z is calculated by $$DIST(j) = \sqrt{(xl(i)-ex)^2 + (yl(i)-ey)^2} \quad (19)$$

$$ez = zl(j) - \frac{DIST(j)*zp(i)}{\sqrt{xp(i)^2 + yp(i)^2}}$$

EX, EY, EX are estimates of location. XL(j), YL(j, ZL(j) are location of lights. XP(i), YP(i), ZP(i) are location of spots. Unlikely z-values are excluded, and the remaining z values averaged. The six values, x, y, z, pitch, roll, and heading (yaw) are returned to the control program A source code listing implementing the navigation algorithm 9000 as described herein is provided in the attached Appendix (incorporated herein by reference).

Accuracy Considerations

Accuracy of the robot navigation can be further improved by controlling at least the following several variables: (1) Increase the number of pixels in the CCD camera chip. In a 2000×2000 pixel CCD chip, one pixel in the middle of one edge subtends about one foot at a 1000' radius. However, by regression on more than 7 beacons, the error normally can be reduced to two or three inches and the error is reduced further in smaller fields and by other methods of computation; (2) Increase the number of beacon spots collected in a single CCD image and included in navigation computation; (3) Reduce the distance of the robot from the nearest two or three lights; (4) Increase the size of the beacon light spot (e.g. increase the light bulb and/or globe). When the beacon is close and the bulb filament or globe is large or the image is enlarged by defocusing the camera, the image can cover more than one pixel. In this case, the true center is the center of mass of the column and row of contiguous pixels; and (5) Increase the number of images that can be integrated as the vehicle moves along the row which in turn depends on the speed of the camera (number of frames per second).

By adjusting these parameters to match the precision required to work a crop, accuracy can equal or better that provided by the average human tractor driver.

Further, as mentioned above, error correction processes can compensate for the small motion of the cart during a flash sampling interval (e.g. 30 ms.). For example, the determination of whether an error in location exists is the result of comparison of where the robot is, information that comes from the navigation routine 700, and where it "thinks" it is. Since the last navigation fix, various velocities have been in effect for known times and their consequences can be determined by simple integration. Hence at the moment of a navigation interrupt, location (as it would be at the time the CCD picture is frozen) is calculated. Then the signal to the CCD to start a picture cycle is sent. For 30 ms the computer is occupied with this picture taking, then navigation routine 700 executes, error is determined, then a correction vector is calculated and new velocities and intervals sent to the driver motors.

In the case that another timer times out during the period during which the Navigation routine is running, it is backlogged, since in 30 ms, the vehicle moves only a third of an inch. However, when control is returned, and new velocities are to be calculated (in addition to the ones generated by the Navigation comparisons) compensation is made in the computations and the debacklogged interrupt is processed.

A characteristic of this error correction process is that the kind of errors that are detected at each fix can be saved and studied in aggregate. Since most implements will have the effect of dragging the cart slightly off course in some consistent way, these accumulated errors become an information base and allow for modifying track speeds to accommodate this consistent bias. Programs to perform this kind of analysis can run in the gaps between interrupts since available time is a substantial fraction of CPU time.

Location and orientation error is influenced by the number of pixels on one edge of the chip where doubling the number halves the error and by distance from the beacons to the robot where halving the distance halves the error. This is due to truncation error resulting from the fact that an image anywhere in the pixel gives the same coordinates. The number of beacons has negligible effect. The error can be reduced if the beacon lights are nearby.

In a simulation of a system using a 2000 by 2000 pixel chip and working in a ten acre field (660 feet on a side), a random pair of x, y coordinates were compared with the location calculated by the navigation algorithm from images of n beacons that would be observable from that x, y point. The regression function, $$-x*xu(i)+y*yu(i)=xl(i)*yu(i)-yl(i)*xu(i)$$

was solved for I=1 . . . n where n ranged from 7 to 20. The calculated location of the center of the cone averaged 1.4 inches in both x and y from the true location with an average rms error of 2.1 inches.

Subsequently the lights were rearranged with zl(j) allowed to vary randomly in the range 6 to 12 feet above the ground as shown in FIG. 8. This change had a remarkable effect on accuracy, reducing errors in x,y and heading by 75% to less than one half inch except along the edges of the work area.

Conclusion

This system provides a high degree of repeatability so that even though the first trip through the field (to plant, say) is somewhat different from the desired route, all subsequent trips will be very close to that initial route. Thus the route of the knives of a cultivator should be held to within an inch of an emerging crop.

The automated gardening robot should be able to work 17,024 feet of 30" beds in 4.7 hours (5 acres per day since it can work in the dark) at a row speed of about 1 foot per second. Locational accuracy averaging one half inch have been achieved in computer simulations.

An important attribute of this system is its ability to expand its area of operations. Suppose the location of seven beacons (which may be street lights or lighted navigation buoys or even radio stations whose frequencies can be found by scanning) is known. Then when the next one comes into view, its location can be determined by triangulation from known points determined by the navigation module 338. Then, one that will soon go out of view can be dropped and the remaining six and the new one used for navigation. Given this series of overlapping areas, if the area is traversable, its size is unlimited.

Areas serviceable include any area where seven lights are visible. A long strip, e.g., a golf course fairway or a highway median would have as many lights as necessary placed along both sides. At start, the navigation module 338 finds in its scenario, a first set of eight lights and navigates with them until one of the eight, say A, is further away than a new light coming to view (B) which replaces A in the list of lights at the proper location in the list to maintain the counterclockwise order. This process continues until the entire area 110 has been serviced.

In sum, the present invention provides a robot that performs precise navigation and work operations by accounting for six degrees of freedom over a rough topology. The operation of the robot is completely automated during operation in the field. Preparation and pre-programming is simple, user-friendly, and flexible. Automated agricultural operations adapt easily to meet the commercial demands of a farmer in the face of changing seasons, soil conditions, crop patterns, and other influences on land use.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. An automated gardening system for performing tasks in a garden comprising:
    at least seven navigation beacons positioned around a perimeter of said garden, each beacon emitting electromagnetic radiation across said garden; and
    a robot for moving through the garden and performing gardening tasks; wherein said robot includes:
        a panoramic image collector which gathers and focuses said electromagnetic radiation from each navigation beacon at a common focal plane to form at least seven beam spots corresponding to the respective navigation beacons, wherein the relative position of said at least seven beam spots in said focal plane varies depending upon the position and the orientation of said robot within the garden;
        an imaging camera positioned at said focal plane to detect at least seven beam spots and output electrical signals representative thereof;
        a navigation module for processing said electrical signals from said imaging camera to determine the position and orientation of the robot within the garden;
        a controller for controlling at least one driver motor and at least one implement, each driver motor propels said robot along a predetermined path and each implement performs a gardening task along said predetermined path; and
        wherein said controller controls each driver motor to drive said robot along said predetermined path based on said detected position and orientation determined by said navigation module.

2. The system of claim 1, wherein each navigation beacon includes an emitter for emitting electromagnetic radiation, said electromagnetic radiation comprising any one of infrared, visible and UV radiation.

3. The system of claim 1, wherein each navigation beacon includes an emitter; said emitters are distributed at different heights.

4. The system of claim 1, further comprising,
    switching means for flashing each emitter and for synchronizing readout of said imaging camera to obtain a first image of the scene covering background when said emitters are on and a second image when said emitters are off, and a third image representing the difference between the two which contains the images of the emitters but no other images.

5. The system of claim 1, wherein said panoramic image collector comprises a panoramic mirror.

6. The system of claim 5, wherein said panoramic mirror comprises a conical mirror having an axis parallel to an optical axis of the imaging camera and a 360 degree horizontal field of view around the said robot and an approximately 30 degree field of view covering a range above and below the horizon and including a predetermined height of said navigation beacons.

7. The system of claim 5, wherein said panoramic mirror comprises a conical mirror having a Gothic-shaped reflective surface.

8. The system of claim 1, wherein said robot is subject to movement having six degrees of freedom, said orientation determined by said navigation module comprises a heading in the garden, and said position determined by said navigation module comprises a location in the garden with respect to two position coordinates.

9. The system of claim 1, wherein said robot is subject to movement having six degrees of freedom, said orientation determined by said navigation module comprises heading, pitch, and roll in the garden, and said position calculated by said navigation module comprises a position in the garden with respect to three position coordinates.

10. The system of claim 1, wherein said navigation module periodically determines location and heading of said robot.

11. The system of claim 1, wherein said controller further provides servo-control to each drive motor to correct a location and a heading of said robot along said predetermined path based on detected pitch and roll to maintain the orientation of said implement within a predetermined range.

12. The system of claim 1, wherein said controller further controls each implement to perform tasks at predetermined locations along said predetermined path based on said detected position determined by said navigation module.

13. The system of claim 1, wherein the garden comprises a commercial truck garden having a size less than approximately eleven acres.

14. The system of claim 1, comprising at least eight navigation beacons, a work area being determined by at least seven beacons nearest to the robot.

15. The system of claim 1, further comprising a remote control unit for manually controlling said robot.

16. The system of claim 1, wherein said at least one implement comprises at least one automated agricultural implement selected from the following group of implements: tiller, sprayer, seed planter, transplanter, cultivator, mulcher, vacuum insect controller, harvester, and prepacker.

17. The system of claim 1, wherein said navigation module determines the position of said implement within the garden with an accuracy averaging approximately one-half inch.

18. The system of claim 1, wherein said navigation module comprises:

means for calculating n sets of position coordinates $xu(i)$, $yu(i)$, and $zu(i)$ for each beam spot i;

means for determining a beam spot $i_{RMS}$, said beam spot $i_{RMS}$ being determined when a match is made between a set of lights (j) stored during calibration and said set of beam spots (i), and when a sum of the squares of two Euler coefficients $c(4)$ and $c(7)$ is at a minimum;

means for calculating yaw, pitch, and roll based on Euler coefficents $c(3)$, $c(4)$, and $c(7)$ determined at the determined beam spot $i_{RMS}$;

means for calculating estimated x, y positions Ex, Ey by regression on all n lights based on the following equation:

$$E_x * yp(i) - E_y * xp(i) = xl(j) * yp(i) - yl(j) * xp(i),$$

where $xp(i)$, $yp(i)$ are the coordinates of the i-th beam spots and $xl(j)$, $yl(j)$ are the coordinates of light j, j being equal to $(i+i_{RMS}-2)$ mod n+1;

means for testing direction of yaw to determine whether yaw is between two angles $\phi_1$ and $\phi_2$ about a heading and adjusting Ex, Ey, pitch, roll, and yaw values when yaw is not between $\phi_1$ and $\phi_2$; and means for calculating an estimated value $E_z$ based on the following equation:

$$DIST(j) = \sqrt{(xl(i) - ex)^2 + (yl(i) - ey)^2}$$

-continued $$ez = zl(j) - \frac{DIST(j) * zp(i)}{\sqrt{xp(i)^2 + yp(i)^2}}$$

here $xl(i)$, $zl(i)$ are the coordinates of the i-th beam spots and $xp(j)$, $zp(j)$ are the coordinates of light j, j being equal to $(i+i_{RMS}-2)$ mod n+1; and means for determining orientation information on the robot including said pitch, roll, and yaw and position information including three position coordinates x,y,z obtained from said Ex, Ey, and Ez values.

19. A method for controlling a robot to perform automated tasks along a path in a work area comprising the steps of:

focusing light emitted from at least seven navigation beacons at a common focal plane to form at least seven corresponding beam spots, wherein the relative position of said at least seven beam spots in said focal plane varies depending upon changes in at least one of six degrees of movement of the robot within the work area;

detecting positions of said at least seven beam spots on an imaging device and outputting electrical signals representative thereof; and processing said electrical signals to determine location and heading of the robot within the work area.

20. The method of claim 19, wherein said processing step includes the steps of:

determining a set of Euler coefficients $c(1)$ to $c(8)$ for each beacon light position $(xl(j), yl(j), zl(j))$ in a set of beacon light positions and each detected beam spot position $(xu(i), yu(i), zu(i))$ in a set of beam spot positions; and identifying a particular beam spot and corresponding beacon light that causes said particular beam spot.

21. The method of claim 20, wherein said identifying step comprises identifying a matching beam spot irms, said beam spot $i_{RMS}$ being determined when a match is made between said set of beacon light positions stored during calibration and said set of detected beam spot positions, and when a RMS function equal to the sum of the squares of two Euler coefficients $c(4)$ and $c(7)$ is at a minimum.

22. The method of claim 21, further comprising the steps of:

calculating yaw, pitch, and roll based on coefficents $c(3)$, $c(4)$, and $c(7)$ determined at the beam spot $i_{RMS}$;

calculating estimated x, y positions Ex, Ey by regression on all n lights based on the following equation:

$$E_x * yp(i) - E_y * xp(i) = xl(j) * yp(i) - yl(j) * xp(i),$$

where $xp(i)$, $yp(i)$ are the coordinates of the i-th beam spots and $xl(j)$, $yl(j)$ are the coordinates of light j, j being equal to $(i+i_{RMS}-2)$ mod n+1;

testing direction of yaw to determine whether yaw is between two angles $\phi_1$ and $\phi_2$ about a heading and adjusting Ex, Ey, pitch, roll, and yaw values when yaw is not between $\phi_1$ and $\phi_2$; and calculating an estimated value $E_z$ based on the following equation:

$$DIST(j) = \sqrt{(xl(i) - ex)^2 + (yl(i) - ey)^2}$$

-continued $$ez = zl(j) - \frac{DIST(j) * zp(i)}{\sqrt{xp(i)^2 + yp(i)^2}}$$

where xl(i), zl(i) are the coordinates of the i-th beam spots and xp(j), zp(j) are the coordinates of light j, j being equal to $(i+i_{RMS}-2)$ mod n+1; and determining orientation information on the robot including said pitch, roll, and yaw and position information including three position coordinates x,y,z obtained from said Ex, Ey, and Ez values.

23. A navigation method for a robot that performs automated tasks along a path in a work area and periodically detects n beam spots from corresponding n navigation beacons positioned around the work area and which emit light, n being an integer greater than six, wherein the relative positions of said n beam spots (i) in a focal plane varies depending upon changes in at least one of six degrees of movement of the robot within the work area; the navigation method comprising:

determining a set of Euler coefficients c(1) to c(8) for each beacon light position (xl(j), yl(j), zl(j)) in a set of beacon light positions and for each detected beam spot position (xu(i), yu(i), zu(i)) in a set of beam spot positions; and identifying a particular beam spot and corresponding beacon light that causes said particular beam spot; whereby, the location and heading of the robot in the work area can be determined.

24. The method of claim 23, wherein said identifying step comprises identifying a matching beam spot $i_{RMS}$, said beam spot $i_{RMS}$ being determined when a match is made between said set of beacon light positions stored during calibration and said set of detected beam spot positions, and when a RMS function equal to the sum of the squares of two Euler coefficients c(4) and c(7) is at a minimum.

25. The method of claim 24, further comprising the steps of:

calculating yaw, pitch, and roll based on coefficents c(3), c(4), and c(7) determined at the beam spot $i_{RMS}$;

calculating estimated x, y positions Ex, Ey by regression on all n lights based on the following equation:

$$E_x*yp(i)-E_y*xp(i)=xl(j)*yp(i)-yl(j)*xp(i),$$

where xp(i), yp(i) are the coordinates of the i-th beam spots and xl(j), yl(j) are the coordinates of light j, j being equal to $(i+i_{RMS}-2)$ mod n+1;

testing direction of yaw to determine whether yaw is between two angles $\phi_1$ and $\phi_2$ about a heading and adjusting Ex, Ey, pitch, roll, and yaw values when yaw is not between $\phi_1$ and $\phi_2$; and calculating an estimated value $E_z$ based on the following equation:

$$DIST(j) = \sqrt{(xl(i) - ex)^2 + (yl(i) - ey)^2}$$

$$ez = zl(j) - \frac{DIST(j) * zp(i)}{\sqrt{xp(i)^2 + yp(i)^2}}$$

where xl(i), zl(i) are the coordinates of the i-th beam spots and xp(j), zp(j) are the coordinates of light j, j being equal to $(i+i_{RMS}-2)$ mod n+1; and determining orientation information on the robot including said pitch, roll, and yaw and position information including three position coordinates x,y,z obtained from said Ex, Ey, and Ez values.

* * * * *